(12) United States Patent
Won

(10) Patent No.: US 11,645,773 B2
(45) Date of Patent: May 9, 2023

(54) METHOD FOR ACQUIRING DISTANCE FROM MOVING BODY TO AT LEAST ONE OBJECT LOCATED IN ANY DIRECTION OF MOVING BODY BY PERFORMING NEAR REGION SENSING AND IMAGE PROCESSING DEVICE USING THE SAME

(71) Applicant: MULTIPLEYE CO., LTD., Seoul (KR)

(72) Inventor: Chang Hee Won, Seoul (KR)

(73) Assignee: MULTIPLEYE CO., LTD., Seoul (KR)

( * ) Notice: Subject to any disclaimer, the term of this patent is extended or adjusted under 35 U.S.C. 154(b) by 0 days.

(21) Appl. No.: 17/866,309

(22) Filed: Jul. 15, 2022

(65) Prior Publication Data
US 2023/0041657 A1 Feb. 9, 2023

(30) Foreign Application Priority Data
Jul. 26, 2021 (KR) .................. 10-2021-0098043

(51) Int. Cl.
*G06T 7/55* (2017.01)
*G06T 7/80* (2017.01)
(Continued)

(52) U.S. Cl.
CPC .................. *G06T 7/55* (2017.01); *G06T 7/60* (2013.01); *G06T 7/80* (2017.01); *H04N 23/90* (2023.01);
(Continued)

(58) Field of Classification Search
CPC .... G06T 7/55; G06T 7/60; G06T 7/80; G06T 2207/20084; G06T 2207/30244; G06T 2207/30252; H04N 23/90
See application file for complete search history.

(56) References Cited

U.S. PATENT DOCUMENTS 11,307,595 B2 * 4/2022 Lim ...................... G06T 7/593
2018/0293454 A1 * 10/2018 Xu .......................... G06T 7/248
(Continued)

FOREIGN PATENT DOCUMENTS

KR  10-2021-0049581 A  5/2021

OTHER PUBLICATIONS

Komatsu et al. "360° Depth Estimation from Multiple Fisheye Images with Origami Crown Representation of Icosahedron" 2020 IEEE/RSJ International Conference on Intelligent Robots and Systems (IROS) Oct. 25-29, 2020.
(Continued)

*Primary Examiner* — Molly Wilburn
(74) *Attorney, Agent, or Firm* — Maschoff Brennan

(57) ABSTRACT

A method for acquiring a distance from a moving body to an object located in any direction of the moving body includes steps of: an image processing device (a) instructing a rounded cuboid sweep network to project pixels of images, generated by cameras covering all directions of the moving body, onto N virtual rounded cuboids to generate rounded cuboid images and apply 3D concatenation operation thereon to generate an initial 4D cost volume, (b) instructing a cost volume computation network to generate a final 3D cost volume from the initial 4D cost volume, and (c) generating inverse radius indices, corresponding to inverse radii representing inverse values of separation distances of the N virtual rounded cuboids, by referring to the final 3D cost volume and extracting the inverse radii by using the inverse radius indices, to acquire the separation distances and thus, the distance from the moving body to the object.

22 Claims, 18 Drawing Sheets

(51) Int. Cl.
G06T 7/60 (2017.01)
H04N 23/90 (2023.01)
(52) U.S. Cl.
CPC .............. G06T 2207/20084 (2013.01); G06T 2207/30244 (2013.01); G06T 2207/30252 (2013.01)

(56) References Cited

U.S. PATENT DOCUMENTS

2018/0322611 A1* 11/2018 Bang ..................... G06T 3/0062
2019/0138029 A1* 5/2019 Ryll ....................... G05D 1/106
2020/0273192 A1* 8/2020 Cheng ................... G06F 18/213

OTHER PUBLICATIONS

Won et al. "OmniMVS: End-to-End Learning for Omnidirectional Stereo Matching" 2019 IEEE/CVF International Conference on Computer Vision (ICCV) Oct. 27, 2019-Nov. 2, 2019.
Korean Office action in KR Application No. 10-2021-0098043 dated Nov. 15, 2021.
Korean Decision to Grant dated Feb. 28, 2022 as received in application No. 10-2021-0098043.

* cited by examiner

FIG. 8

Algorithm 1: multi-view P3P RANSAC algorithm

Data: 2D feature locations and 3D landmark correspondences in all views, $\{\{(\bar{x}_{ij}, {}^W X_{ij})\}_{ij}\}_j$

Result: Rigid body transformation ${}^b_w \theta^*$

1 while $iter < iter_{max}$ do
2      Select a camera $j'$ using PPS sampling.
3      Randomly sample 3 pairs in the selected camera.
4      Get camera pose candidates $\{{}^{j'}_w \theta_k\}$ by P3P.
5      Compute the body pose candidates $\{{}^b_w \theta_k\}$.
6      for each body pose candidate ${}^b_w \theta_k$ do
7          for each camera $j$ do
8              Compute the camera pose ${}^j_w \theta_k$.
9              Add reprojection error of all inliers in $j$:
10             $C_k \mathrel{+}= \sum_{ij} \max(0, \tau_r - \|\bar{x}_{ij} - \pi_0({}^j_w \theta_k \star {}^W X_{ij})\|)$
11          end
12          if $C_k$ is largest then
13              ${}^b_w \theta^* \leftarrow {}^b_w \theta_k$.
14              Update $iter_{max}$ with the new inlier ratio.
15          end
16      end
17 end

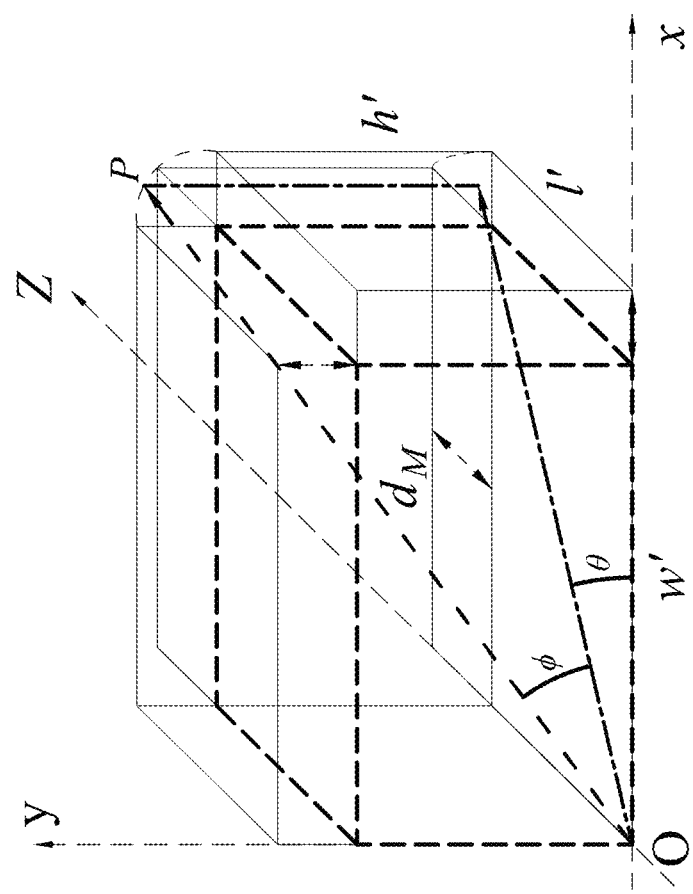

METHOD FOR ACQUIRING DISTANCE FROM MOVING BODY TO AT LEAST ONE OBJECT LOCATED IN ANY DIRECTION OF MOVING BODY BY PERFORMING NEAR REGION SENSING AND IMAGE PROCESSING DEVICE USING THE SAME

CROSS REFERENCE OF RELATED APPLICATION

This present application claims the benefit of the earlier filing date of Korean non-provisional patent application No. 10-2021-0098043, filed Jul. 26, 2021, the entire contents of which being incorporated herein by reference.

FIELD OF THE DISCLOSURE

The present disclosure relates to a method for acquiring a distance from a moving body to at least one object located in any direction of the moving body and an image processing device using the same; and more particularly, to the method for acquiring the distance from the moving body to at least one object located in any direction of the moving body by projecting multiple images obtained from multiple cameras onto multiple rounded cuboids, and the image processing device using the same.

BACKGROUND OF THE DISCLOSURE

In order for a moving body, such as an autonomous vehicle, to navigate smoothly, distance information on one or more objects located around the moving body is required.

Conventionally, LIDAR sensors, RADAR sensors and cameras, etc. have been used as means to obtain the distance information on the objects located around the moving body.

However, methods requiring the use of the LIDAR sensors or the RADAR sensors yield outputs of low resolutions despite their high cost and large power consumption.

On the other hand, conventional technologies adopting the cameras to obtain the distance information on the objects form a plurality of virtual spheres, each having a different radius from one another, whose centers are set as a same specific point on the moving body, so as to obtain the distance information of the objects by projecting images obtained from the cameras onto the virtual spheres.

By referring to FIG. 1 which is schematically illustrating an example of a conventional technology acquiring the distance information of the objects located around the moving body, multiple spherical images are obtained by projecting images including a specific object onto the multiple virtual spheres 100_1, 100_2, 100_3 and then in response to determining that pixels corresponding to the specific object are located on a k-th virtual spherical image among the multiple spherical images by performing predetermined operations on the multiple spherical images, a distance corresponding to a radius $r_k$ of the k-th virtual sphere is estimated as the distance between the specific object and the moving body.

However, the conventional technology described above has a problem in that it is hard to estimate the distance information related to those objects located within an inner region of the virtual sphere 100_1 having the smallest radius.

Therefore, an enhanced method for solving the aforementioned problem is required.

SUMMARY OF THE DISCLOSURE

It is an object of the present disclosure to solve all the aforementioned problems.

It is another object of the present disclosure to acquire a distance of a moving body to at least one object located in any direction of the moving body.

It is still another object of the present disclosure to flexibly adjust a distance candidate group to be used for acquiring the distance to at least one object from the moving body.

It is still yet another object of the present disclosure to obtain an accurate distance of at least one object from the moving body even when a length of a horizontal axis and a length of a vertical axis of the moving body are different from each other.

In accordance with one aspect of the present disclosure, there is provided a method for acquiring a distance from a moving body to at least one object located in any direction of the moving body, including steps of: (a) on condition that a plurality of cameras, capable of covering all directions of the moving body by using each of their respective Field of Views (FoVs), have been arranged to be apart from one another on the moving body, an image processing device, in response to acquiring a plurality of images generated by the cameras, inputting the images to a rounded cuboid sweep network and instructing the rounded cuboid sweep network to (i) project a plurality of pixels on the images obtained from the cameras onto N virtual rounded cuboids to thereby generate a plurality of rounded cuboid images, wherein each of the N virtual rounded cuboids includes each of extended plane sets, respectively having three extended planes, and curved surfaces interconnecting at least two of the three extended planes, and wherein each of the three extended planes is formed at each of separation distances from each of three reference planes, orthogonal to one another, of a reference virtual geometry obtained on a basis of a structure of the moving body or an arrangement of the cameras, and (ii) apply three-dimensional (3D) concatenation operation to the plurality of the rounded cuboid images and thus generate an initial four-dimensional (4D) cost volume; (b) the image processing device inputting the initial 4D cost volume to a cost volume computation network, including a plurality of 3D convolution layers and their corresponding 3D deconvolution layers, to thereby generate a final 3D cost volume; and (c) the image processing device (i) generating inverse radius indices by using the final 3D cost volume, wherein each of the inverse radius indices respectively corresponds to each of inverse radii representing each of inverse values of each of the separation distances of the N virtual rounded cuboids, and (ii) extracting the inverse radii of the N virtual rounded cuboids by referring to the inverse radius indices, to thereby acquire each of the separation distances and thus acquire a distance from the moving body to the at least one object located in any direction of the moving body.

As one example, a K-th virtual rounded cuboid among the N virtual rounded cuboids includes a K-th extended plane set having a (K_1)-st extended plane, a (K_2)-nd extended plane and a (K_3)-rd extended plane, and a K-th curved surface interconnecting at least two of the (K_1)-st extended plane, the (K_2)-nd extended plane and the (K_3)-rd extended plane, wherein the (K_1)-st extended plane, the (K_2)-nd extended plane and the (K_3)-rd extended plane are respectively formed at a (K_1)-st separation distance, a (K_2)-nd separation distance and a (K_3)-rd separation distance respectively from a first reference plane, a second reference plane and a third reference plane which are the three reference planes of the reference virtual geometry, and wherein, at the step of (c), the image processing device (i) generates K-th inverse radius indices of K-th inverse radii by using the final 3D cost volume, wherein the K-th inverse radii includes a (K_1)-st inverse radius, a (K_2)-nd inverse radius and a (K_3)-rd inverse radius, respectively representing inverse values of the (K_1)-st separation distance, the (K_2)-nd separation distance and the (K_3)-rd separation distance of the K-th virtual rounded cuboid, and (ii) acquires the (K_1)-st separation distance, the (K_2)-nd separation distance and the (K_3)-rd separation distance by referring to the K-th inverse radii corresponding to the K-th inverse radius indices, wherein K is an integer bigger than or equal to 1 and smaller than or equal to N.

As another example, (i) a (K_1&2)-th curved surface connecting the (K_1)-st extended plane and the (K_2)-nd extended plane, (ii) a (K_2&3)-th curved surface connecting the (K_2)-nd extended plane and the (K_3)-rd extended plane, (iii) a (K_3&1)-th curved surface connecting the (K_3)-rd extended plane and the (K_1)-st extended plane, and (iv) a (K_1&2&3)-th curved surface connecting the (K_1)-st extended plane, the (K_2)-nd extended plane and the (K_3)-rd extended plane are included in the K-th virtual rounded cuboid as the K-th curved surface.

As another example, at the step of (a), the image processing device instructs the rounded cuboid sweep network to (i) compute a specific distance $d_M$ equivalent to a distance between a predetermined reference point of the reference virtual geometry and a specific point on an M-th virtual rounded cuboid, wherein M is an integer bigger than or equal to 1 and smaller than or equal to N, and (ii) project the plurality of pixels on the images obtained from the cameras onto the M-th virtual rounded cuboid by referring to the specific distance $d_M$, wherein the specific distance $d_M$ is determined by an equation:

$$d_M = f(r_M, \theta, \Psi, w, h, l)$$

wherein (i) $r_M$ is the separation distance between the reference virtual geometry and the M-th virtual rounded cuboid, (ii) $\theta$ and $\Psi$ are respectively an azimuth angle and a polar angle of a virtual line segment connecting the specific point and the predetermined reference point of the reference virtual geometry in a spherical coordinate system having the predetermined reference point as an origin, and (iii) w, h and l are respectively lengths of a first edge, a second edge and a third edge of the reference virtual geometry which are orthogonal to one another.

As another example, an aspect ratio of the reference virtual geometry is determined by referring to an aspect ratio of the structure of the moving body or an aspect ratio of a virtual cuboid circumscribed to the moving body.

As another example, the image processing device further performs a step of: (d) the image processing device generating at least one absolute error loss by referring to the inverse radius indices and their corresponding ground truth inverse radius indices and thus training at least part of the rounded cuboid sweep network and the cost volume computation network by using the absolute error loss through an end-to-end way.

As another example, each of coordinates of each of pixels located on the rounded cuboid images is represented by using each of azimuth angles and each of polar angles on a virtual spherical coordinate system, and wherein, at the step of (c), the image processing device normalizes the final 3D cost volume by referring to each of the azimuth angles and each of the polar angles of the virtual spherical coordinate system, to thereby generate the inverse radius indices.

As another example, before the step of (a), the image processing device performs a calibration process which applies an optimization operation to one or more external parameters and one or more internal parameters of the cameras, wherein the optimization operation is carried out by (i-1) locating a checker board, having grid patterns thereon, in between two adjacent cameras among the cameras arranged to be apart from one another on the moving body, and detecting each coordinate of each corner of the checker board by using reference images obtained from the adjacent cameras, (i-2) performing the calibration process capable of optimizing one or more specific external parameters and one or more specific internal parameters of the adjacent cameras by referring to the each coordinate of each corner of the checker board such that a re-projection error between the reference images is minimized, and (ii) while selecting other two adjacent cameras among the cameras, repeatedly performing the calibration process for said other adjacent cameras, to thereby optimize the external parameters and the internal parameters of all the cameras.

As another example, the cameras are arranged to be apart from one another on a rig mounted on the moving body, and wherein, before the step of (a), the image processing device minimizes (i) a first geometric error associated with camera posture information of the cameras corresponding to rig posture information of the rig, (ii) a second geometric error associated with 3D points corresponding to a surrounding environment map on a location of the moving body, and (iii) a third geometric error associated with external parameters including relative posture information among the cameras, to thereby perform an optimization process that tracks changes in the camera posture information caused by movements of the moving body.

As another example, in response to receiving the images from the cameras, the image processing device processes the images obtained from the cameras by repeatedly performing an image processing process, to thereby perform the optimization process with processed images, wherein the image processing process includes sub-processes of (i) determining a rig-plane including all the cameras thereon by using a least square calculation, (ii) acquiring information on a specific plane that is perpendicular to the rig-plane and is in parallel to a line connecting two adjacent cameras among the plurality of cameras, (iii) projecting a first image part, captured at a region where the FoVs of the adjacent cameras overlap, onto a planar model parallel to the specific plane and projecting a second image part, captured at a region where the FoVs of the adjacent cameras do not overlap, onto a cylindrical model perpendicular to the specific plane, and (iv) obtaining a hybrid projection model by referring to the planar model and the cylindrical model.

As another example, after performing the image processing process, the image processing device (i) selects a specific camera from the plurality of cameras and samples multiple sets of image points, wherein each set of image points includes three specific corresponding pairs each of which is comprised of (1) a two-dimensional (2D) image point on a specific image captured by the specific camera and (2) its corresponding actual three-dimensional (3D) point, (ii) repeatedly samples other multiple sets of other image points which include three other corresponding pairs for all other cameras except the specific camera among the cameras, to thereby acquire all pieces of the rig posture information of the rig, and confirms a geometric conformability of the rig posture information by applying all pieces of the rig posture information to all three corresponding pairs, including the three specific corresponding pairs and said three other corresponding pairs, and (iii) determines a certain set of image points which possesses most number of its corresponding pairs with errors smaller than or equal to a preset threshold and selects certain rig posture information corresponding to the certain set of image points as optimized rig posture information for the rig to thereby minimize the first geometric error.

As another example, at the step of (a), in response to receiving the images from the cameras, the image processing device generates a plurality of feature maps corresponding to the images by inputting the images to a plurality of 2D convolution layers, and thus generates the rounded cuboid images from the feature maps.

In accordance with another aspect of the present disclosure, there is provided an image processing device for acquiring a distance from a moving body to at least one object located in any direction of the moving body, including: at least one memory that stores instructions; and at least one processor configured to execute the instructions to perform or support another device to perform: (I) on condition that a plurality of cameras, capable of covering all directions of the moving body by using each of their respective Field of Views (FoVs), have been arranged to be apart from one another on the moving body, in response to acquiring a plurality of images generated by the cameras, a process of inputting the images to a rounded cuboid sweep network and instructing the rounded cuboid sweep network to (i) project a plurality of pixels on the images obtained from the cameras onto N virtual rounded cuboids to thereby generate a plurality of rounded cuboid images, wherein each of the N virtual rounded cuboids includes each of extended plane sets, respectively having three extended planes, and curved surfaces interconnecting at least two of the three extended planes, and wherein each of the three extended planes is formed at each of separation distances from each of three reference planes, orthogonal to one another, of a reference virtual geometry obtained on a basis of a structure of the moving body or an arrangement of the cameras, and (ii) apply three-dimensional (3D) concatenation operation to the plurality of the rounded cuboid images and thus generate an initial four-dimensional (4D) cost volume, (II) a process of inputting the initial 4D cost volume to a cost volume computation network, including a plurality of 3D convolution layers and their corresponding 3D deconvolution layers, to thereby generate a final 3D cost volume, and (III) processes of (i) generating inverse radius indices by using the final 3D cost volume, wherein each of the inverse radius indices respectively corresponds to each of inverse radii representing each of inverse values of each of the separation distances of the N virtual rounded cuboids, and (ii) extracting the inverse radii of the N virtual rounded cuboids by referring to the inverse radius indices, to thereby acquire each of the separation distances and thus acquire a distance from the moving body to the at least one object located in any direction of the moving body.

As one example, a K-th virtual rounded cuboid among the N virtual rounded cuboids includes a K-th extended plane set having a (K_1)-st extended plane, a (K_2)-nd extended plane and a (K_3)-rd extended plane, and a K-th curved surface interconnecting at least two of the (K_1)-st extended plane, the (K_2)-nd extended plane and the (K_3)-rd extended plane, wherein the (K_1)-st extended plane, the (K_2)-nd extended plane and the (K_3)-rd extended plane are respectively formed at a (K_1)-st separation distance, a (K_2)-nd separation distance and a (K_3)-rd separation distance respectively from a first reference plane, a second reference plane and a third reference plane which are the three reference planes of the reference virtual geometry, and wherein, at the processes of (III), the processor (i) generates K-th inverse radius indices of K-th inverse radii by using the final 3D cost volume, wherein the K-th inverse radii includes a (K_1)-st inverse radius, a (K_2)-nd inverse radius and a (K_3)-rd inverse radius, respectively representing inverse values of the (K_1)-st separation distance, the (K_2)-nd separation distance and the (K_3)-rd separation distance of the K-th virtual rounded cuboid, and (ii) acquires the (K_1)-st separation distance, the (K_2)-nd separation distance and the (K_3)-rd separation distance by referring to the K-th inverse radii corresponding to the K-th inverse radius indices, wherein K is an integer bigger than or equal to 1 and smaller than or equal to N.

As another example, (i) a (K_1&2)-th curved surface connecting the (K-1)-st extended plane and the (K_2)-nd extended plane, (ii) a (K_2&3)-th curved surface connecting the (K_2)-nd extended plane and the (K_3)-rd extended plane, (iii) a (K_3&1)-th curved surface connecting the (K_3)-rd extended plane and the (K_1)-st extended plane, and (iv) a (K_1&2&3)-th curved surface connecting the (K_1)-st extended plane, the (K_2)-nd extended plane and the (K_3)-rd extended plane are included in the K-th virtual rounded cuboid as the K-th curved surface.

As another example, at the process of (I), the processor instructs the rounded cuboid sweep network to (i) compute a specific distance $d_M$ equivalent to a distance between a predetermined reference point of the reference virtual geometry and a specific point on an M-th virtual rounded cuboid, wherein M is an integer bigger than or equal to 1 and smaller than or equal to N, and (ii) project the plurality of pixels on the images obtained from the cameras onto the M-th virtual rounded cuboid by referring to the specific distance $d_M$, wherein the specific distance $d_M$ is determined by an equation:

$$d_M = f(r_M, \theta, \Psi, w, h, l)$$

wherein (i) $r_M$ is the separation distance between the reference virtual geometry and the M-th virtual rounded cuboid, (ii) $\theta$ and $\Psi$ are respectively an azimuth angle and a polar angle of a virtual line segment connecting the specific point and the predetermined reference point of the reference virtual geometry in a spherical coordinate system having the predetermined reference point as an origin, and (iii) w, h and l are respectively lengths of a first edge, a second edge and a third edge of the reference virtual geometry which are orthogonal to one another.

As another example, an aspect ratio of the reference virtual geometry is determined by referring to an aspect ratio of the structure of the moving body or an aspect ratio of a virtual cuboid circumscribed to the moving body.

As another example, the processor further performs a process of: (IV) generating at least one absolute error loss by referring to the inverse radius indices and their corresponding ground truth inverse radius indices and thus training at least part of the rounded cuboid sweep network and the cost volume computation network by using the absolute error loss through an end-to-end way.

As another example, each of coordinates of each of pixels located on the rounded cuboid images is represented by using each of azimuth angles and each of polar angles on a virtual spherical coordinate system, and wherein, at the processes of (III), the processor normalizes the final 3D cost volume by referring to each of the azimuth angles and each of the polar angles of the virtual spherical coordinate system, to thereby generate the inverse radius indices.

As another example, before the process of (I), the processor performs a calibration process which applies an optimization operation to one or more external parameters and one or more internal parameters of the cameras, wherein the optimization operation is carried out by (i-1) locating a checker board, having grid patterns thereon, in between two adjacent cameras among the cameras arranged to be apart from one another on the moving body, and detecting each coordinate of each corner of the checker board by using reference images obtained from the adjacent cameras, (i-2) performing the calibration process capable of optimizing one or more specific external parameters and one or more specific internal parameters of the adjacent cameras by referring to the each coordinate of each corner of the checker board such that a re-projection error between the reference images is minimized, and (ii) while selecting other two adjacent cameras among the cameras, repeatedly performing the calibration process for said other adjacent cameras, to thereby optimize the external parameters and the internal parameters of all the cameras.

As another example, the cameras are arranged to be apart from one another on a rig mounted on the moving body, and wherein, before the process of (I), the processor minimizes (i) a first geometric error associated with camera posture information of the cameras corresponding to rig posture information of the rig, (ii) a second geometric error associated with 3D points corresponding to a surrounding environment map on a location of the moving body, and (iii) a third geometric error associated with external parameters including relative posture information among the cameras, to thereby perform an optimization process that tracks changes in the camera posture information caused by movements of the moving body.

As another example, in response to receiving the images from the cameras, the processor processes the images obtained from the cameras by repeatedly performing an image processing process, to thereby perform the optimization process with processed images, wherein the image processing process includes sub-processes of (i) determining a rig-plane including all the cameras thereon by using a least square calculation, (ii) acquiring information on a specific plane that is perpendicular to the rig-plane and is in parallel to a line connecting two adjacent cameras among the plurality of cameras, (iii) projecting a first image part, captured at a region where the FoVs of the adjacent cameras overlap, onto a planar model parallel to the specific plane and projecting a second image part, captured at a region where the FoVs of the adjacent cameras do not overlap, onto a cylindrical model perpendicular to the specific plane, and (iv) obtaining a hybrid projection model by referring to the planar model and the cylindrical model.

As another example, after performing the image processing process, the processor (i) selects a specific camera from the plurality of cameras and samples multiple sets of image points, wherein each set of image points includes three specific corresponding pairs each of which is comprised of (1) a two-dimensional (2D) image point on a specific image captured by the specific camera and (2) its corresponding actual three-dimensional (3D) point, (ii) repeatedly samples other multiple sets of other image points which include three other corresponding pairs for all other cameras except the specific camera among the cameras, to thereby acquire all pieces of the rig posture information of the rig, and confirms a geometric conformability of the rig posture information by applying all pieces of the rig posture information to all three corresponding pairs, including the three specific corresponding pairs and said three other corresponding pairs, and (iii) determines a certain set of image points which possesses most number of its corresponding pairs with errors smaller than or equal to a preset threshold and selects certain rig posture information corresponding to the certain set of image points as optimized rig posture information for the rig to thereby minimize the first geometric error.

As another example, at the process of (I), in response to receiving the images from the cameras, the processor generates a plurality of feature maps corresponding to the images by inputting the images to a plurality of 2D convolution layers, and thus generates the rounded cuboid images from the feature maps.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

FIG. 8 is a drawing schematically illustrating a camera posture estimation algorithm in accordance with one example embodiment of the present disclosure.

FIGS. 10A to 10G are drawings schematically illustrating a method for computing a specific distance $d_M$ equivalent to a distance between a predetermined reference point of the reference virtual geometry and a specific point on the virtual rounded cuboid in accordance with one example embodiment of the present disclosure.

DETAILED DESCRIPTION OF THE PREFERRED EMBODIMENTS

Figure 1:
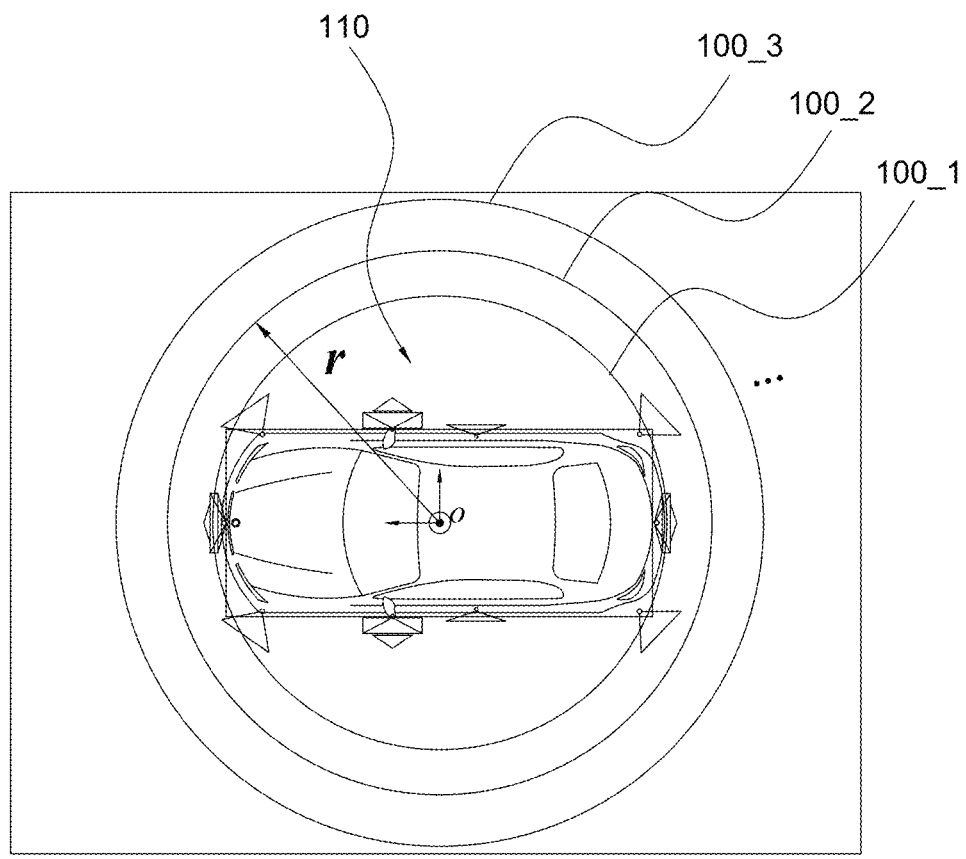
FIG. 1 is a drawing schematically illustrating an example of a conventional method of acquiring a distance of a moving body to at least one object located in any direction of the moving body.

The following detailed description of the present disclosure refers to the accompanying drawings, which show by way of illustration a specific embodiment in which the present disclosure may be practiced, in order to clarify the objects, technical solutions and advantages of the present disclosure. These embodiments are described in sufficient detail to enable those skilled in the art to practice the present disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

Figure 2:
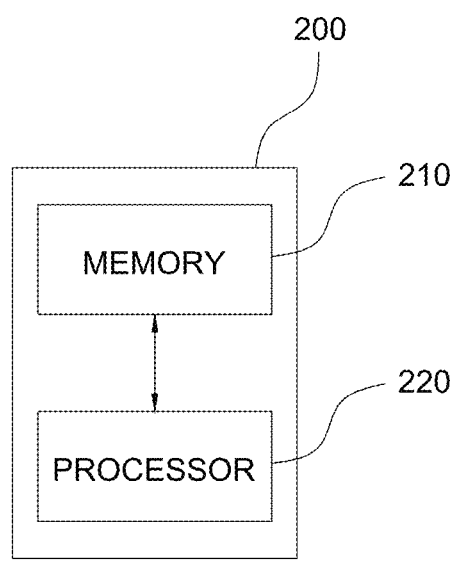
FIG. 2 is a drawing schematically illustrating an image processing device for acquiring the distance of the moving body to at least one object located in any direction of the moving body in accordance with one example embodiment of the present disclosure.

FIG. 2 is a drawing schematically illustrating an image processing device 200 for acquiring a distance of a moving body to at least one object located in any direction of the moving body in accordance with one example embodiment of the present disclosure.

By referring to FIG. 2, the image processing device 200 may include a memory 210 for storing instructions to acquire the distance to at least one object from the moving body, and a processor 220 for acquiring the distance to at least one object from the moving body according to the instructions in the memory 210. Herein, the image processing device may include devices such as a PC (Personal Computer), a mobile computer, etc.

Specifically, the image processing device 200 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

A process of acquiring the distance of at least one object from the moving body by using the image processing device 200 configured as explained above is described below.

First, on condition that a plurality of cameras have been arranged to be apart from one another on the moving body, a plurality of images captured by the cameras may be acquired.

Herein, the plurality of images generated by the plurality of cameras may be transferred directly to the image processing device or may be transferred to the image processing device via a separate device such as a relay device. In addition, the plurality of images may be transmitted to the image processing device through a wireless communication method or a wired communication method.

Also, the plurality of cameras may have wide field of views (FoVs) and may be capable of covering all directions of the moving body by using each of their respective FoVs.

For example, the plurality of cameras may be arranged in diagonal directions with respect to a moving direction of the moving body. Herein, the diagonal directions may represent directions of 45 degrees, −45 degrees, 225 degrees and −225 degrees from the moving direction (e.g., forward direction) of the moving body. Thus, a total of four cameras may be required. However, the above-described numerical values are just provided for an illustrative purpose, and the number of cameras, the arrangement direction of the cameras, and the FoVs of the cameras are not limited to the above-described numerical values.

As each camera has a wide FoV, it is possible to capture images for all directions (front views, side views and rear views) of the moving body even with a limited number of cameras. In addition, for all directions, there are overlapping regions captured by least two cameras, and this makes it possible to estimate how far an object is from the moving body. A detailed arrangement of the plurality of cameras and their ensuing effects are described later by referring to FIGS. 3 and 4.

In response to receiving the plurality of images from the cameras, the image processing device may perform image processing on the plurality of images received. For example, the cameras may be fisheye lens cameras that possess image distortion characteristics different from those of normal cameras. Accordingly, in order to more effectively perform processes, such as a process of estimating "corresponding pairs" on the images, which are described later, the image processing device may first perform a process of compensating for image distortion specific to the fisheye lens cameras on the images received.

For example, the image processing device may perform the image processing on the plurality of images by projecting a first image part, captured at a region where the FoVs of the plurality of cameras overlap, onto a planar model and projecting a second image part, captured at a region where the FoVs of the plurality of cameras do not overlap, onto a cylindrical model. Herein, there may be more than one first image part and more than one second image part for each of the cameras, and each first region or each second region of each of the cameras may be projected respectively onto their corresponding planar model and corresponding cylindrical model.

Herein, the image processing device may merge the first image part projected on the planar model and the second image part projected on the cylindrical model by using a hybrid projection model that smoothly connects the planar model and the cylindrical model. This is described in detail later by referring to FIG. 6.

Then, the image processing device may perform stereo matching on the plurality of images received to thereby obtain distance information on at least one object located in any direction of the moving body.

Herein, the image processing device may use originally obtained images to acquire the distance information on the object, but the present disclosure is not limited thereto.

As an example, the image processing device may input the plurality of images to a synthetic neural network to thereby extract a plurality of feature maps corresponding to the plurality of images and acquire the distance information on at least one object located in any direction of the moving body by using the plurality of feature maps. Correspondingly, when the feature maps are used instead of the original images, there is an effect of reducing computational load required during the stereo matching.

Thus so far, a process of acquiring the distance from the moving body to at least one object located in any direction of the moving body is schematically described, and detailed explanation is provided below.

Figure 3:
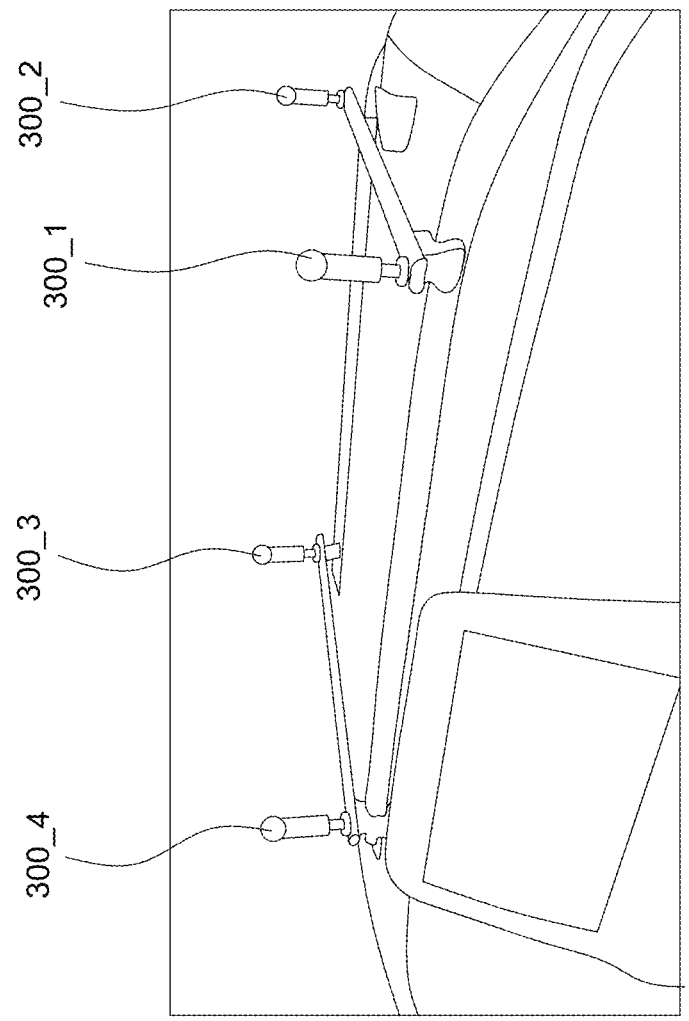
FIG. 3 is a drawing schematically illustrating a state of arranging the plurality of cameras to be apart from one another on the moving body in accordance with one example embodiment of the present disclosure.

FIG. 3 is a drawing schematically illustrating a state of arranging the plurality of cameras to be apart from one another on the moving body in accordance with one example embodiment of the present disclosure. Further, FIG. 4 is a drawing schematically illustrating image capturing ranges of the cameras 300_1, 300_2, 300_3, 300_4 in accordance with one example embodiment of the present disclosure.

Figure 4:
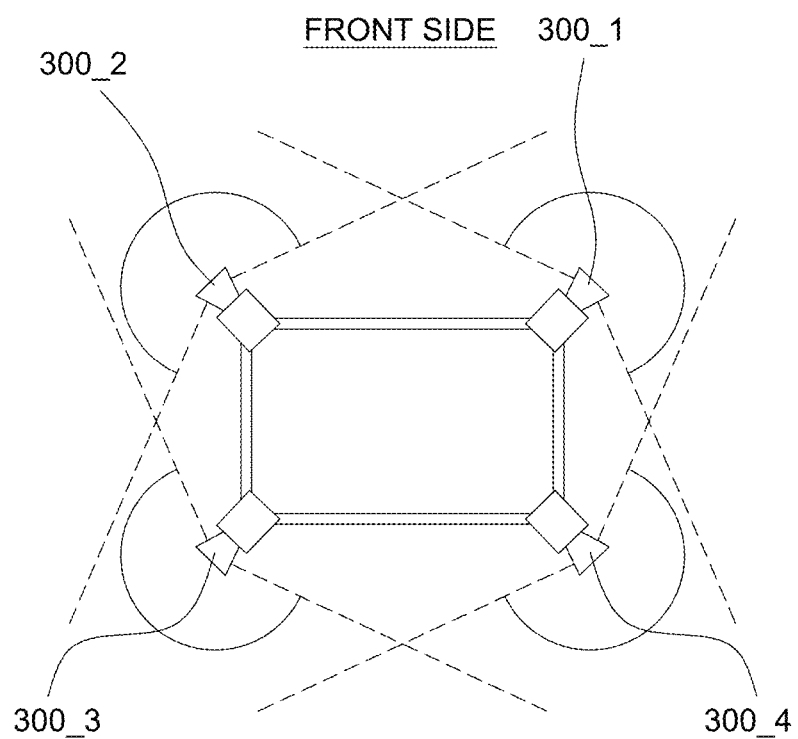
FIG. 4 is a drawing schematically illustrating image capturing ranges of the plurality of cameras in accordance with one example embodiment of the present disclosure.

By referring to FIGS. 3 and 4, it can be seen that four cameras are disposed on the moving body, for example, at each corner of a roof of a vehicle.

For example, a first camera 300_1 may be disposed on the right front side of the vehicle roof to thereby capture images of the right front side of the vehicle.

Also, a second camera 300_2 may be disposed on the left front side of the vehicle roof to thereby capture images of the left front side of the vehicle.

In this case, since FoV of the first camera 300_1 and FoV the second camera 300_2 overlap with each other at the front side of the vehicle, it is possible to estimate a distance between the vehicle and an object located at the front side of the vehicle.

Further, a third camera 300_3 may be disposed on the left back side of the vehicle roof to thereby capture images of the left back side of the vehicle.

In this case, since the FoV of the second camera 300_2 and FoV of the third camera 300_3 overlap with each other at the left side of the vehicle, it is possible to estimate a distance between the vehicle and an object located on the left side of the vehicle.

Also, a fourth camera 300_4 may be disposed on the right back side of the vehicle roof to thereby capture images of the right back side of the vehicle.

In this case, since the FoV of the third camera 300_3 and FoV of the fourth camera 300_4 overlap with each other at the back side of the vehicle, it is possible to estimate a distance between the vehicle and an object located at the back side of the vehicle.

In this case, since the FoV of the fourth camera 300_4 and the FoV of the first camera 300_1 overlap with each other at the right side of the vehicle, it is possible to estimate a distance between the vehicle and an object located on the right side of the vehicle.

Herein, each of the first to the fourth cameras 300_1, 300_2, 300_3, 300_4 described above may have a wide FoV (e.g. a FoV of 220 degrees) in horizontal direction and have a wide separation distance from each other (e.g. a separation distance of approximately 80 cm to 100 cm). Then, each pair comprised of two cameras spaced apart from each other for each of the front/left/right/rear sides of the vehicle may capture images for their respective sides.

In the example shown in FIGS. 3 and 4, the plurality of cameras 300_1, 300_2, 300_3, 300_4 have been illustrated as being disposed on the roof of the vehicle. However, as other possible arrangements, the cameras may alternatively be arranged on pillars of the vehicle (e.g. A-pillar and C-pillar) or on a bonnet or side mirrors of the vehicle.

Also, although the above-described example has illustrated the vehicle as a passenger car, other types of vehicles such as freight cars or various industrial vehicles may be used during implementation, in which case the cameras will be arranged in regions suitable to capture the surroundings of the vehicle omni-directionally.

In addition, the present disclosure may be applicable not only to moving bodies operated by wheels but also to moving bodies operated by caterpillar wheels, drones and ships operated by propellers, etc.

Further, the cameras described above are not limited to generating images belonging to a visible light spectrum, and may also generate images belonging to an infrared ray spectrum.

Meanwhile, in order to acquire an accurate distance to an object by using the images obtained from the cameras, it is first necessary to accurately estimate three-dimensional (3D) postures of the cameras arranged on the moving body.

Therefore, a method of performing a calibration process of the cameras is described below.

Figure 5:
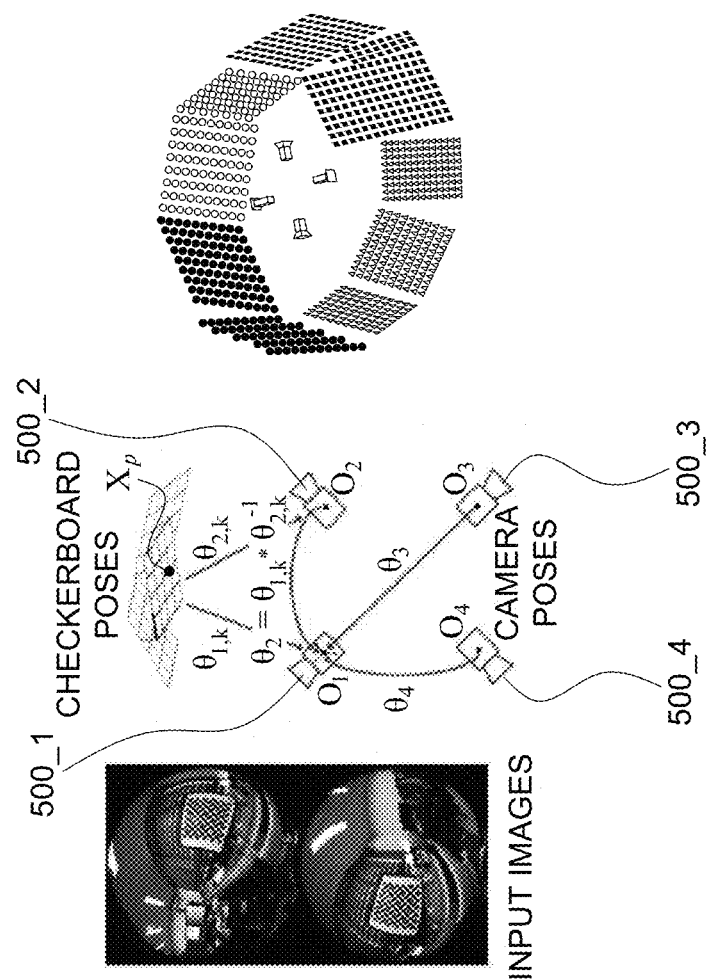
FIG. 5 is a drawing schematically illustrating a process of performing camera calibration in accordance with one example embodiment of the present disclosure.

FIG. 5 is a drawing schematically illustrating the process of performing camera calibration in accordance with one example embodiment of the present disclosure.

In a state of positioning a checker board to be simultaneously captured by two adjacent cameras, the two adjacent cameras may simultaneously capture the corresponding checker board as shown as an example in the reference images located on the left-side of FIG. 5.

Next, as shown in the illustration in the middle of FIG. 5, the image processing device may detect areas where the checker board is located in each of the reference images captured by each of the cameras, to thereby perform the camera calibration on the two adjacent cameras based on the areas detected. For example, the first camera 500_1 may be calibrated based on the second camera 500_2, the third camera 500_3 may be sequentially calibrated based on the second camera 500_2, and finally, the fourth camera 500_4 may be calibrated based on the second camera 500_2.

Alternatively, the four cameras 500_1, 500_2, 500_3, 500_4 may be calibrated at the same time by positioning checker boards in at least three of four directions (i.e., front direction, left direction, right direction and rear direction).

Herein, the image processing device may perform the calibration process to minimize a re-projection error between corner coordinates of the checker board on the reference images of the two adjacent cameras.

For example, the image processing device may calculate relative positions of each camera with respect to the checker board, and optimize external parameters and internal parameters of each of the cameras by referring to the relative positions.

For reference, the external parameters may be parameters related to relative postures of the cameras with respect to each other, and the internal parameters may be related to lens parameters of each of the cameras.

In other words, the optimization operation of the external parameters and the internal parameters may be carried out by (i-1) locating the checker board, having grid patterns thereon, in between the two adjacent cameras among the cameras arranged to be apart from one another on the moving body, and detecting each coordinate of each corner of the checker board by using the reference images obtained from the adjacent cameras, (i-2) performing the calibration process capable of optimizing one or more specific external parameters and one or more specific internal parameters of the adjacent cameras by referring to the each coordinate of each corner of the checker board such that the re-projection error between the reference images is minimized, and (ii) while selecting other two adjacent cameras among the cameras, repeatedly performing the calibration process for said other adjacent cameras, to thereby optimize the external parameters and the internal parameters of all the cameras.

Therefore, by performing the above-mentioned calibration process, posture information for each of the cameras may be calculated as shown on the right-side of FIG. 5. On the right-side of FIG. 5, different posture information for different cameras is indicated using different shape patterns.

More specifically, when a projection function (Π) maps a three-dimensional (3D) coordinate (X) onto a two-dimensional (2D) coordinate (x) in a normalized image plane, this can be expressed as Formula 1 stated below.

$$x = \Pi(X; \Phi) \qquad \text{<Formula 1>}$$

Herein, x is the two-dimensional coordinate, X is the three-dimensional coordinate, and Φ is an intrinsic parameter of a camera lens. In this case, the normalized image coordinate (x) may be converted into a pixel coordinate by using an affine transformation A(x).

Also, according to Formula 2 below, the calibration process may be performed to minimize the re-projection error between the corner coordinates of the checker board on the reference images of the two adjacent cameras.

$$\min_{\substack{\Phi_i, A_i \\ \Theta_i, \Theta_k}} \sum_{(i,k)} \sum_p \left\| \tilde{x}_{i,p} - A_i\left(\Pi\left(M(\Theta_i \star \Theta_k)\begin{bmatrix} X_p \\ 1 \end{bmatrix}; \Phi_i\right)\right) \right\|^2 \qquad \text{<Formula 2>}$$

Herein, {(i,k)} is a set of observations of a checker board pose k with an $i^{th}$ camera. Also, $X_p$ is a coordinate of a corner location p in the checker board, and $\tilde{x}_{i,p}$ is a pixel coordinate of $X_p$ in an $i^{th}$ image.

Also, the external parameters may be expressed as $\Theta = (r^T, t^T)^T$. Herein, r may represent axial-angle rotation vector, and t may represent a translation vector (r,t∈ $R^3$).

In addition, a rigid conversion matrix M(Θ) may be given as [R(r) t] where R(r) may be a 3×3 rotation matrix corresponding to r.

Further, from a reference image of the $i^{th}$ camera, intrinsic parameters $\Phi_i$, and $A_i$, as well as a relative position $\{\Phi_{i,k}\}$ of the checker board with respect to the $i^{th}$ camera may be denoted. Herein, k is a capture index.

Also, a relative position from the $i^{th}$ camera to a $j^{th}$ camera may be calculated as $\Theta_{j,k} \star \Theta_{i,k}^{-1}$ from a pair of images (i,k) and (j,k) captured at the same time. Herein, ★ is a composition operation, and $^{-1}$ is an inverse operation.

In addition, if the external parameter of the cameras is converted into $\{\Theta_i^*\}$ in a rig coordinate system, the projection function may be expressed as $A_i(\Pi(X; \Phi_i))$.

Further, in response to external calibrations, poses $\{\Theta_i\}$ of all the cameras and poses $\{\Theta_k\}$ of all the checker boards may be initialized.

Also, a Ceres solver may be used to perform the optimization process.

Meanwhile, as for the cameras of the present invention, the fisheye lens cameras may be used to secure wide FoVs (Field of Views). Herein, even if fisheye images, outputted from the fisheye lens cameras, are capturing a same object, each of the fisheye images may depict the same object very differently from each other due to lens distortion. Accordingly, when relative posture information among the different cameras is not analyzed, it may be difficult to estimate corresponding pairs based on similarities found among the images, i.e., image similarities.

In accordance with one example embodiment of the present disclosure to overcome this problem, the relative posture information among the different cameras may be first acquired, and then an image projection model capable of effectively correcting distortions among the different fisheye images by referring to the relative posture information may be used in order to approximate the corresponding pairs based on the image similarities.

Figure 6:
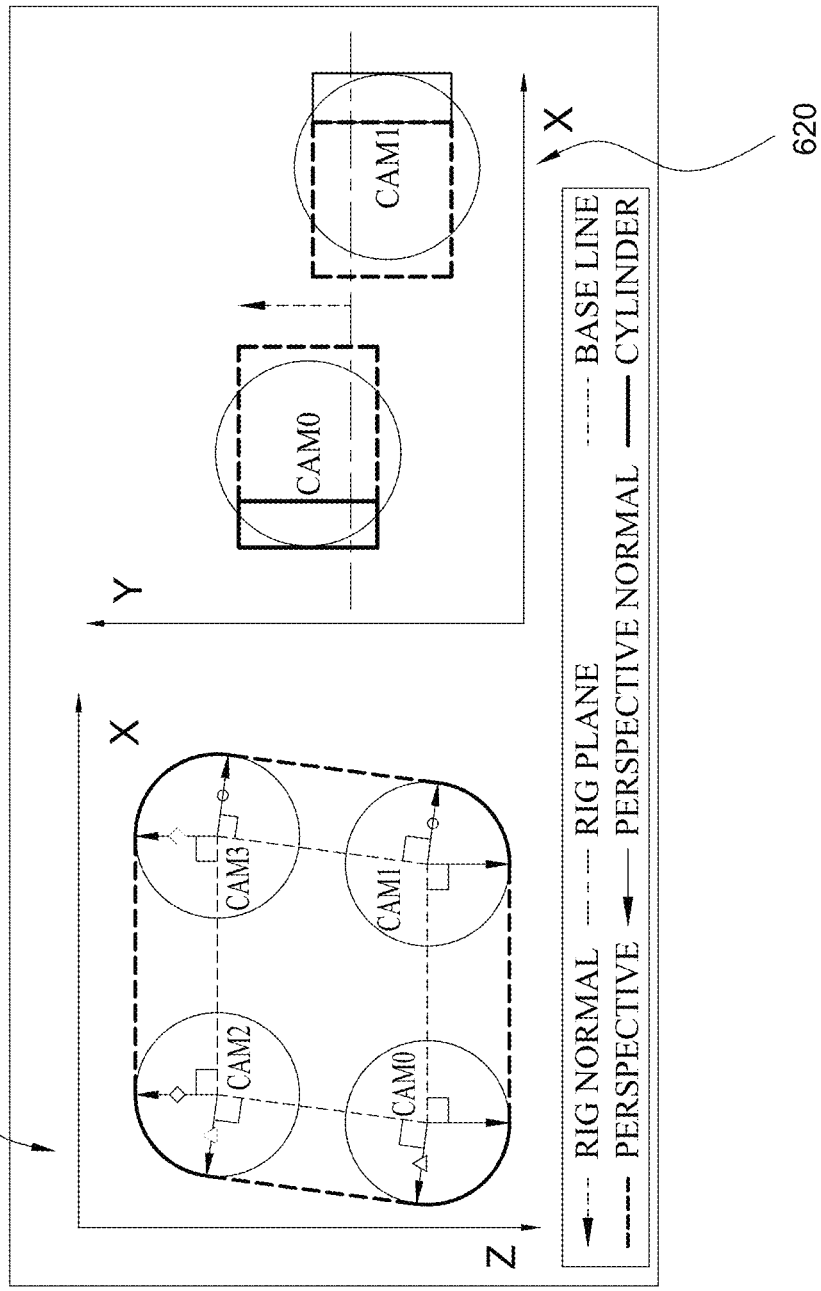
FIG. 6 is a drawing schematically illustrating an image projection model in accordance with one example embodiment of the present disclosure.

FIG. 6 is a drawing schematically illustrating the image projection model in accordance with one example embodiment of the present disclosure.

By referring to FIG. 6, a single plane 610 (a rig-plane, e.g., a x-z plane) that best represents three-dimensional positions of all the cameras may be determined by using a least square calculation, and subsequently another plane 620 (e.g., a x-y plane) that is parallel to lines connecting different adjacent cameras (inter-view) and perpendicular to the rig-plane 610 may be determined. Then, the distortions may be rectified by projecting image parts where the angles of views the adjacent cameras overlap onto their corresponding planar models and projecting image parts where the angles of views of the adjacent cameras do not overlap onto their corresponding cylindrical models.

In detail, in response to receiving the images from the cameras, the image processing device may process the images obtained from the cameras by repeatedly performing an image processing process, to thereby perform the optimization process with processed images, wherein the image processing process includes sub-processes of (i) determining the rig-plane including all the cameras thereon by using the least square calculation, (ii) acquiring information on a specific plane that is perpendicular to the rig-plane and is in parallel to a line connecting two adjacent cameras (baseline) among the plurality of cameras, (iii) projecting the first image part, captured at a region where the FoVs of the adjacent cameras overlap, onto the planar model parallel to the specific plane and projecting the second image part, captured at a region where the FoVs of the adjacent cameras do not overlap, onto the cylindrical model perpendicular to the specific plane, and (iv) obtaining the hybrid projection model by referring to the planar model and the cylindrical model.

Figure 7:
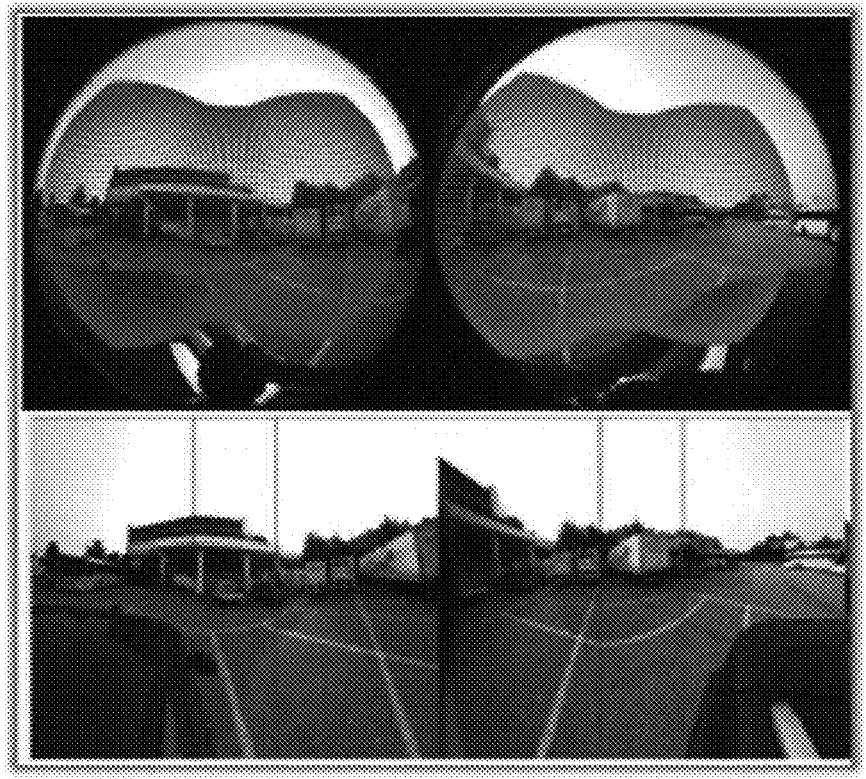
FIG. 7 is a drawing schematically illustrating a stereo image obtained as a result of using the image projection model in accordance with one example embodiment of the present disclosure.

FIG. 7 is a drawing schematically illustrating a stereo image obtained as a result of using the image projection model in accordance with one example embodiment of the present disclosure.

By referring to FIG. 7, it may be observed that corrected images as shown at the bottom of FIG. 7 are generated by improving distortions shown in those two images at the top of FIG. 7.

Meanwhile, conventional posture estimation methods are workable only when a corresponding pair of a two-dimensional point in a monocular camera image and an actual three-dimensional point is known.

On the other hand, the image processing device of the present disclosure has a different condition from the conventional posture estimation methods in that a multi-camera system is used, and thus a posture estimation algorithm applicable to the image processing device of the present disclosure is described by referring to FIG. 8.

FIG. 8 is a drawing schematically illustrating a camera posture estimation algorithm in accordance with one example embodiment of the present disclosure.

By referring to FIG. 8, when three corresponding pairs of 2D image points and actual 3D points are known in the multi-camera system, it is possible that postures of the cameras may be estimated based on a probabilistic distribution thereof.

In detail, after performing the image processing process, the image processing device may (i) select a specific camera from the plurality of cameras and sample multiple sets of image points, wherein each set of image points includes three specific corresponding pairs each of which is comprised of (1) a two-dimensional (2D) image point on a specific image captured by the specific camera and (2) its corresponding actual three-dimensional (3D) point, (ii) repeatedly sample other multiple sets of other image points which include three other corresponding pairs for all other cameras except the specific camera among the cameras, to thereby acquire all pieces of a rig posture information of the rig, and confirm a geometric conformability of the rig posture information by applying all pieces of the rig posture information to all three corresponding pairs, including the three specific corresponding pairs and said three other corresponding pairs, and (iii) determine a certain set of image points which possesses most number of its corresponding pairs with errors smaller than or equal to a preset threshold and select certain rig posture information corresponding to the certain set of image points as optimized rig posture information for the rig to thereby minimize a first geometric error.

Herein, FIG. 8 illustrates one example of determining the optimized rig posture information. Given that the corresponding pairs $\{\{(\bar{x}_{i_j}, {}^w X_{i_j})\}_{i_j}\}_j$ of all the cameras are found, the specific camera may be randomly selected with Probability Proportional to the Size of match pairs (PPS sampling), wherein the PPS sampling may choose the specific cameras that have most number of corresponding pairs based on the assumption that cameras with more match pairs are likely to yield more accurate rig posture information. Then, rig posture candidates may be estimated by using a conventional monocular P3P algorithm on the corresponding pairs of the specific camera, and the geometric conformability, i.e., inlier check, of all the rig posture candidates against all corresponding pairs of all the cameras, may be tested to determine the optimized rig posture information that has the most number of its corresponding pairs with errors smaller than or equal to a preset threshold. Thus, the optimized rig posture information may be determined by referring to an output rig posture ${}_w^b\theta$ obtained at the end of the RANSAC loop.

Meanwhile, the cameras are installed and operated on a single moving body such as a vehicle, and the postures of the cameras may be changed due to shaking of the vehicle, etc. Given the fact that the posture information of the cameras is used for estimating the distance information on the object, errors may occur in estimating final distance information if changed posture information of the cameras is not taken into account.

Therefore, in order to estimate the distance between the object and the moving body by accurately reflecting the changes posture information of the cameras, the image processing device of the present disclosure may ensure the reliability of the distance estimation by simultaneously optimizing the posture information of the cameras, a surrounding environment map and the relative posture information among the cameras.

In detail, in the state that the cameras are arranged to be apart from one another on the rig mounted on the moving body, the image processing device may minimize (i) the first geometric error associated with camera posture information of the cameras corresponding to rig posture information of the rig, (ii) a second geometric error associated with 3D points corresponding to the surrounding environment map on a location of the moving body, and (iii) a third geometric error associated with external parameters including the relative posture information among the cameras, to thereby perform an optimization process that tracks changes in the camera posture information caused by movements of the moving body.

Since the image processing device of the present disclosure may track the changes in the camera posture information by checking the postures of the cameras in real time as described above, a drop in the performance of the distance estimation caused by the movement of the moving body may be prevented.

Given that the optimization process is completed as state above, the image processing device may input the plurality of images to a rounded cuboid sweep network and instruct the rounded cuboid sweep network to project a plurality of pixels on the images obtained from the cameras onto N virtual rounded cuboids to thereby generate a plurality of rounded cuboid images.

For reference, as described above, the image processing device may (i) input the plurality of images to the rounded cuboid sweep network to generate the plurality of rounded cuboid images in accordance with one example embodiment of the present disclosure, but instead may (ii) inputs the plurality of images to a plurality of 2D convolution layers to generate a plurality of feature maps, and then inputs the feature maps into the rounded cuboid sweep network to thereby instruct the rounded cuboid sweep network to generate the rounded cuboid images from the feature maps in accordance with another example embodiment of the present disclosure.

Herein, each of the N virtual rounded cuboids may include each of extended plane sets respectively having (1) three extended planes and (2) curved surfaces interconnecting at least two of the three extended planes. In detail, each of the three extended planes may be formed at each of separation distances from each of three reference planes, orthogonal to one another, of a reference virtual geometry obtained on a basis of a structure of the moving body or an arrangement of the cameras.

Also, an aspect ratio of the reference virtual geometry may be determined by referring to an aspect ratio of the structure of the moving body or an aspect ratio of a virtual cuboid circumscribed to the moving body.

Figure 9:
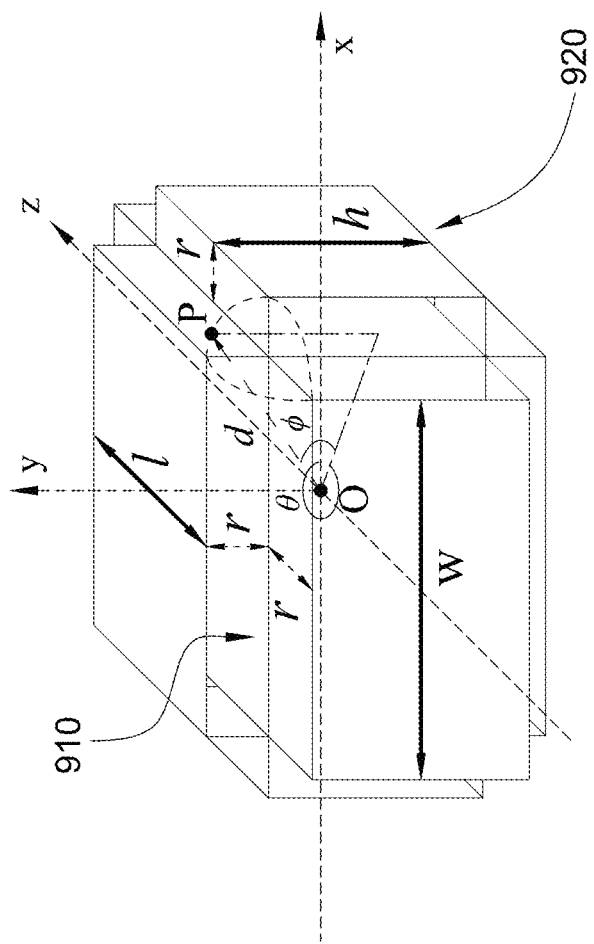
FIG. 9 is a drawing schematically illustrating a reference virtual geometry and a virtual rounded cuboid in accordance with one example embodiment of the present disclosure.

The reference virtual geometry and the virtual rounded cuboid are explained in more detail by referring to FIG. 9.

FIG. 9 is a drawing schematically illustrating the reference virtual geometry 910 and the virtual rounded cuboid 920 in accordance with one example embodiment of the present disclosure.

For reference, FIG. 9 only illustrates one virtual rounded cuboid for convenience of explanation, but the present disclosure does not exclude cases where a plurality of virtual rounded cuboids are used.

By referring to FIG. 9, three edges of the reference virtual geometry 910 may correspond to three axes (e.g. x-axis, y-axis and z-axis) that are orthogonal to each other, and the reference virtual geometry 910 may be a cuboid whose three edges have lengths of w, h and l.

Also, the virtual rounded cuboid 920 may include an extended plane set having three extended planes, and curved surfaces interconnecting at least two of the three extended planes, and each of the three extended planes may be formed at each of separation distances (e.g., a radius r) from each of three reference planes (e.g., three types of planes respectively parallel to x-y plane, y-z plane and x-z plane) of the reference virtual geometry 910. Herein, the three reference planes are orthogonal to one another.

For example, the virtual rounded cuboid may include (i) a first extended plane formed at a separation distance r from both sides of the reference virtual geometry (i.e., along x-axis), (ii) a second extend plane formed at the separation distance r from the front and the back of the reference virtual geometry (i.e., along z-axis), (iii) a third extend plane formed at the separation distance r from the top and the bottom of the reference virtual geometry (i.e., along y-axis), and (iv) the curved surfaces interconnecting at least two of the three extended planes.

Also, in FIG. 9, each of the extended planes included in the extended plane set of the virtual rounded cuboid is illustrated as being formed at the same separation distance r from each of their respective reference planes of the reference virtual geometry, but the present disclosure is not limited thereto.

Herein, a K-th virtual rounded cuboid among the N virtual rounded cuboids includes (i) a K-th extended plane set having a (K_1)-st extended plane, a (K_2)-nd extended plane and a (K_3)-rd extended plane, and (ii) a K-th curved surface interconnecting at least two of the (K_1)-st extended plane, the (K_2)-nd extended plane and the (K_3)-rd extended plane, wherein the (K_1)-st extended plane, the (K_2)-nd extended plane and the (K_3)-rd extended plane are respectively formed at a (K_1)-st separation distance, a (K_2)-nd separation distance and a (K_3)-rd separation distance respectively from a first reference plane, a second reference plane and a third reference plane which are the three reference planes of the reference virtual geometry. Herein, K is an integer bigger than or equal to 1 and smaller than or equal to N.

Herein, (i) a (K_1&2)-th curved surface connecting the (K_1)-st extended plane and the (K_2)-nd extended plane, (ii) a (K_2&3)-th curved surface connecting the (K_2)-nd extended plane and the (K_3)-rd extended plane, (iii) a (K_3&1)-th curved surface connecting the (K_3)-rd extended plane and the (K_1)-st extended plane, and (iv) a (K_1&2&3)-th curved surface connecting the (K_1)-st extended plane, the (K_2)-nd extended plane and the (K_3)-rd extended plane may be included in the K-th virtual rounded cuboid as the K-th curved surface.

Meanwhile, in the following, FIGS. 10A to 10G are used to schematically illustrate a method for computing a specific distance $d_M$ equivalent to a distance between a predetermined reference point of the reference virtual geometry and a specific point on the virtual rounded cuboid in accordance with one example embodiment of the present disclosure.

For reference, as mentioned above, the extended plane set of the virtual rounded cuboid may include each of the extended planes formed at each of different distances from each of the three reference planes of the reference virtual geometry, but for convenience of explanation, an M-th virtual rounded cuboid may be assumed to be formed at a same separation distance $r_M$ from the reference virtual geometry.

Figure 10A:
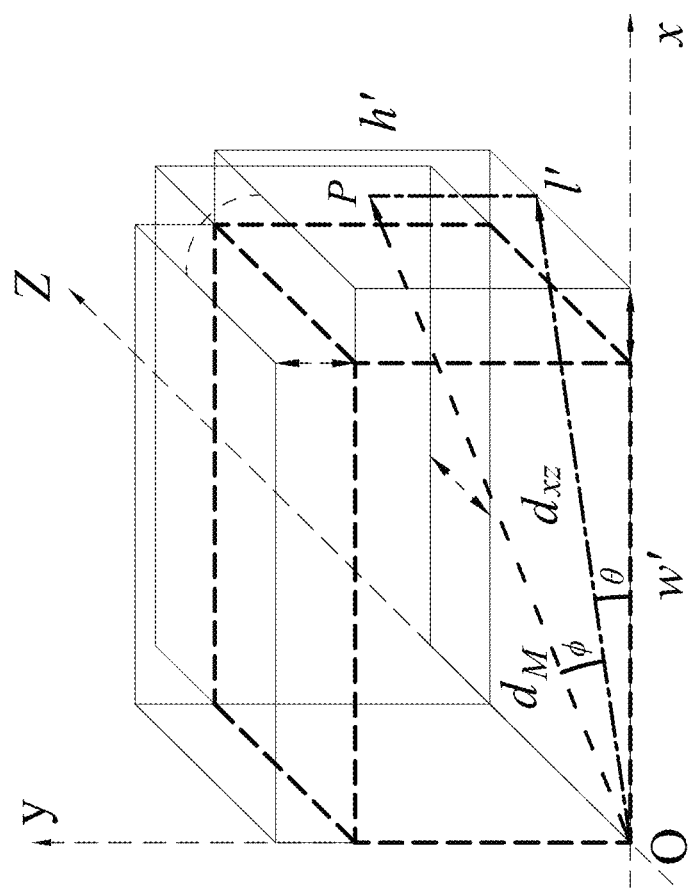

First, by referring to FIG. 10A, a specific distance $d_M$ from a predetermined reference point of the reference virtual geometry to a specific point P on the M-th virtual rounded cuboid may be determined according to an equation below. Herein, the predetermined reference point of the reference virtual geometry may be a location corresponding to a center of gravity of the reference virtual geometry, but the present disclosure is not limited thereto.

$$d_M = f(r_M, \theta, \Psi, w, h, l)$$

Herein, (i) $r_M$ is the separation distance between the reference virtual geometry and the M-th virtual rounded cuboid, (ii) $\theta$ and $\Psi$ are respectively an azimuth angle and a polar angle of a virtual line segment OP connecting the specific point P and the predetermined reference point of the reference virtual geometry in a spherical coordinate system having the predetermined reference point as an origin thereof, and (iii) w, h and l are respectively lengths of a first edge, a second edge and a third edge of the reference virtual geometry which are orthogonal to one another. In the following, any one of $\Psi$ or $\emptyset$ may be used interchangeably as a symbol to represent the polar angle.

For reference, in FIGS. 10A to 10G, only a part of the M-th virtual rounded cuboid and a part of the reference virtual geometry obtained by bisecting the length w of the first edge, the length h of the second edge and the length l of the third edge of the reference virtual geometry are illustrated. That is, the part of the reference virtual geometry illustrated in FIGS. 10A to 10G may be a cuboid whose edges corresponding to x-axis, y-axis and z-axis have lengths equivalent to w'(=w/2), h'(=h/2) and l'(=l/2).

Those skilled in the art will readily understand that the same description may be applied to parts not shown in the drawings.

By referring to FIG. 10A again, the distance $d_M$ between the predetermined reference point O and the specific point P located on an (M_1)-st extended plane of the M-th virtual rounded cuboid which is formed at the separation distance $r_M$ from the first reference plane parallel to the y-z plane may be calculated by equations below.

$$d_{xz}=(w'+r_M)/\cos(\theta)$$

$$d_M=d_{xz}/\cos(\Psi)$$

Figure 10B:
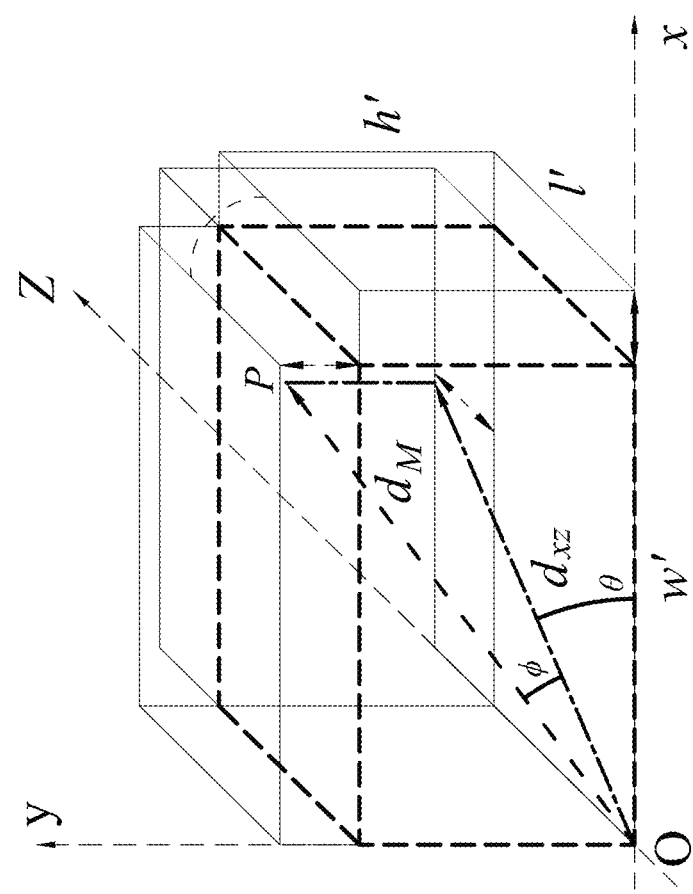

Next, by referring to FIG. 10B, the distance $d_M$ between the predetermined reference point O and the specific point P located on an (M_2)-nd extended plane of the M-th virtual rounded cuboid which is formed at the separation distance $r_M$ from the second reference plane parallel to the x-y plane may be calculated by equations below.

$$d_{xz}=(l'+r_M)/\sin(\theta)$$

$$d_M=d_{xz}/\cos(\Psi)$$

Figure 10C:
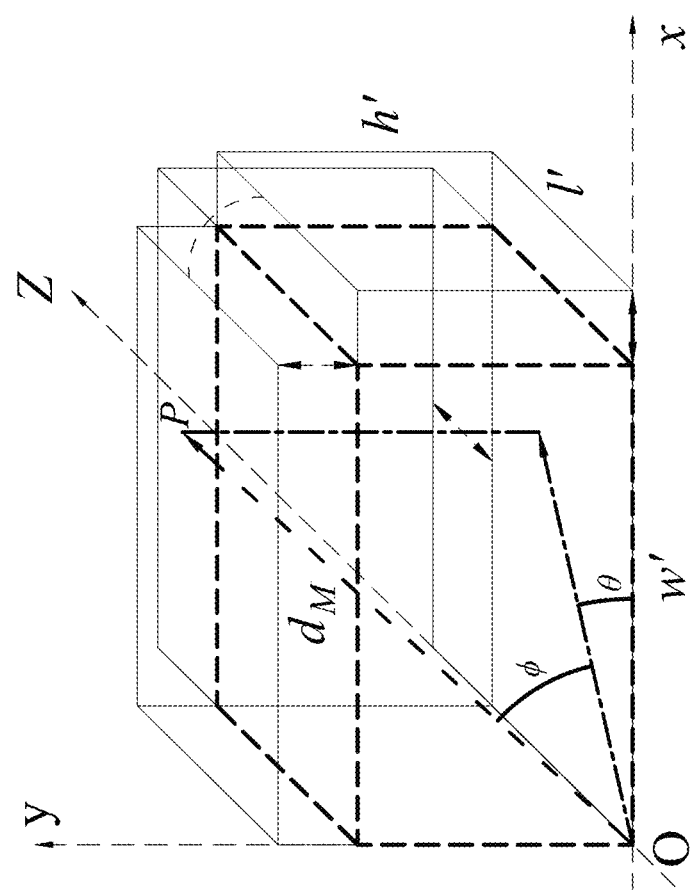

Further, by referring to FIG. 10C, the distance $d_M$ between the predetermined reference point O and the specific point P located on an (M_3)-rd extended plane of the M-th virtual rounded cuboid which is formed at the separation distance $r_M$ from the third reference plane parallel to the x-z plane may be calculated by an equation below.

$$d_M=(h'+r_M)/\sin(\Psi)$$

Figure 10D:
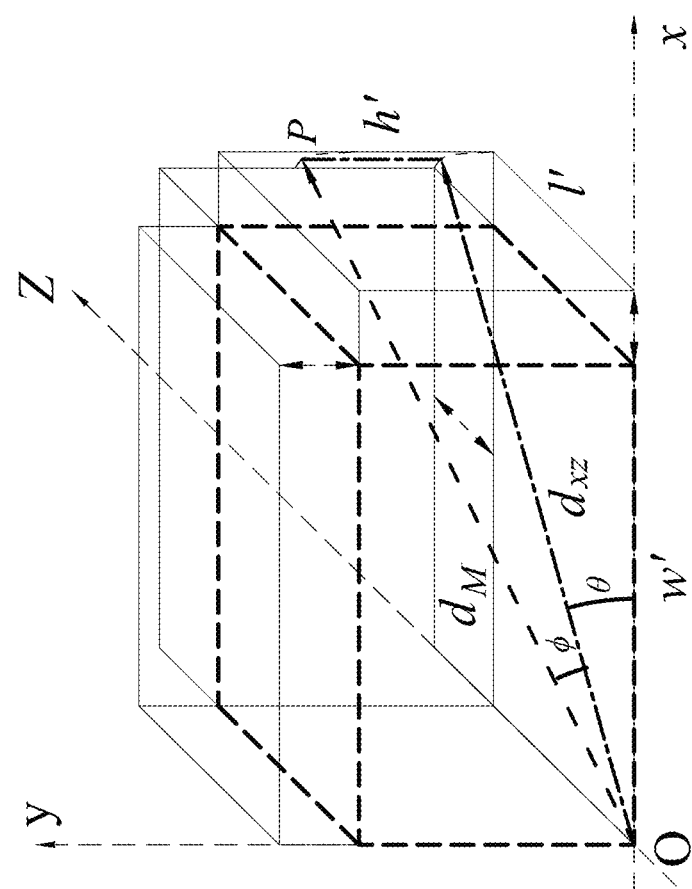

Also, by referring to FIG. 10D, the distance $d_M$ between the predetermined reference point O and the specific point P located on an (M-1&2)-th curved surface that connects (i) the (M_1)-st extended plane of the M-th virtual rounded cuboid which is formed at the separation distance $r_M$ from the first reference plane parallel to the y-z plane and (ii) the (M_2)-nd extended plane of the M-th virtual rounded cuboid which is formed at the separation distance $r_M$ from the second reference plane parallel to the x-y plane may be calculated by equations below.

$$b = w' * \cos(\theta) + l' * \sin(\theta)$$

$$d_{xz} = \frac{b+\sqrt{b^2-w'^2-l'^2+r^2}}{\sin\theta}$$

$$d_M = d_{xz}/\cos(\Psi)$$

Figure 10E:
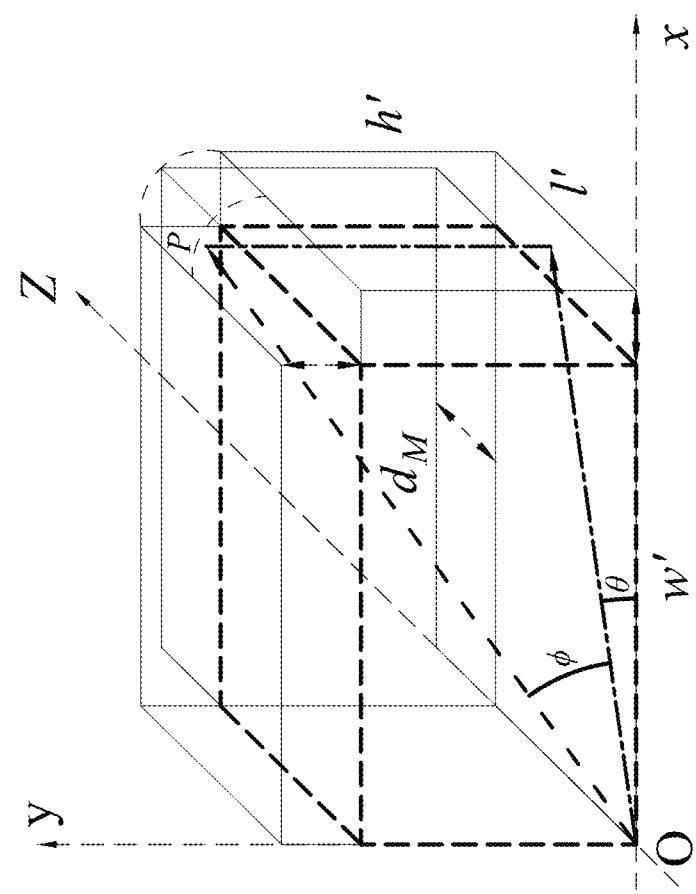

In addition, by referring to FIG. 10E, the distance $d_M$ between the predetermined reference point O and the specific point P located on an (M-1&3)-th curved surface that connects (i) the (M_1)-st extended plane of the M-th virtual rounded cuboid which is formed at the separation distance $r_M$ from the first reference plane parallel to the y-z plane and (ii) the (M_3)-rd extended plane of the M-th virtual rounded cuboid which is formed at the separation distance $r_M$ from the third reference plane parallel to the x-z plane may be calculated by equations below.

$$a = \cos^2(\Psi) + \cos^2(\theta) + \sin^2(\Psi)$$

$$b = w' * \cos(\Psi) * \cos(\theta) + h' * \sin(\Psi)$$

$$c = w'^2 + h'^2 - r^2$$

$$d_M = \frac{b+\sqrt{b^2-ac}}{a}$$

Figure 10F:
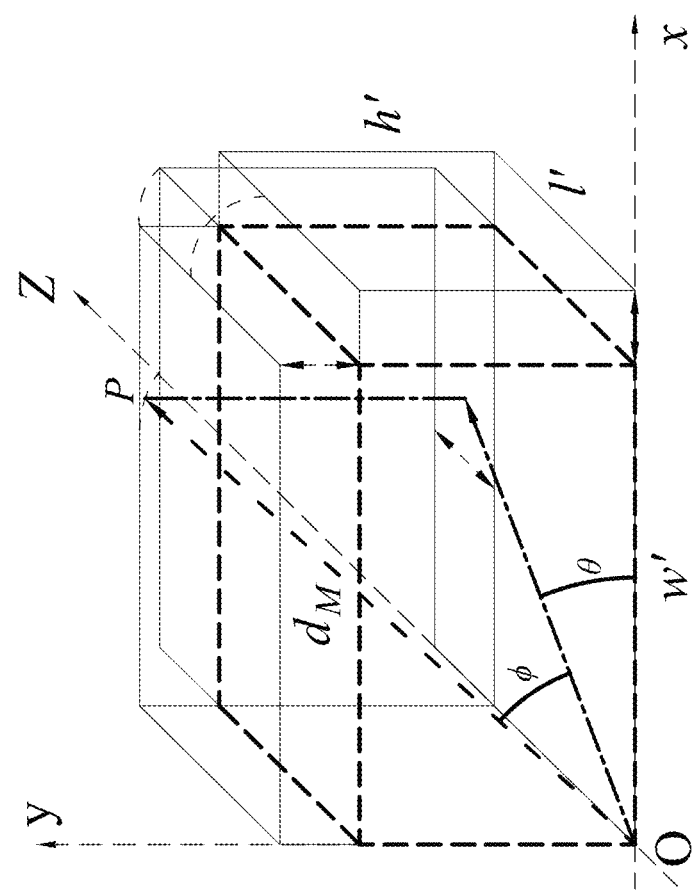

Further, by referring to FIG. 10F, the distance $d_M$ between the predetermined reference point O and the specific point P located on an (M-2&3)-th curved surface that connects (i) the (M_2)-nd extended plane of the M-th virtual rounded cuboid which is formed at the separation distance $r_M$ from the second reference plane parallel to the x-y plane and (ii) the (M_3)-rd extended plane of the M-th virtual rounded cuboid which is formed at the separation distance $r_M$ from the third reference plane parallel to the x-z plane may be calculated by equations below.

$$a = \cos^2(\Psi) + \sin^2(\theta) + \sin^2(\Psi)$$

$$b = l' * \cos(\Psi) * \sin(\theta) + h' * \sin(\Psi)$$

$$c = l'^2 + h'^2 - r^2$$

$$d_M = \frac{b+\sqrt{b^2-ac}}{a}$$

Also, by referring to FIG. 10G, the distance $d_M$ between the predetermined reference point O and the specific point P located on an (M-1&2&3)-th curved surface that connects (i) the (M_1)-st extended plane of the M-th virtual rounded cuboid which is formed at the separation distance $r_M$ from the first reference plane parallel to the y-z plane, (ii) the (M_2)-nd extended plane of the M-th virtual rounded cuboid which is formed at the separation distance $r_M$ from the second reference plane parallel to the x-y plane and (iii) the (M_3)-rd extended plane of the M-th virtual rounded cuboid which is formed at the separation distance $r_M$ from the third reference plane parallel to the x-z plane may be calculated by equations below.

$$b=h'*\sin(\Psi)+w'*\cos(\Psi)*\cos(\Psi)+l'*\cos(\Psi)*\sin(\theta)$$

$$c=h'^2+w'^2+l'^2-r^2$$

$$d_M=b+\sqrt{b^2-c}$$

Figure 11:
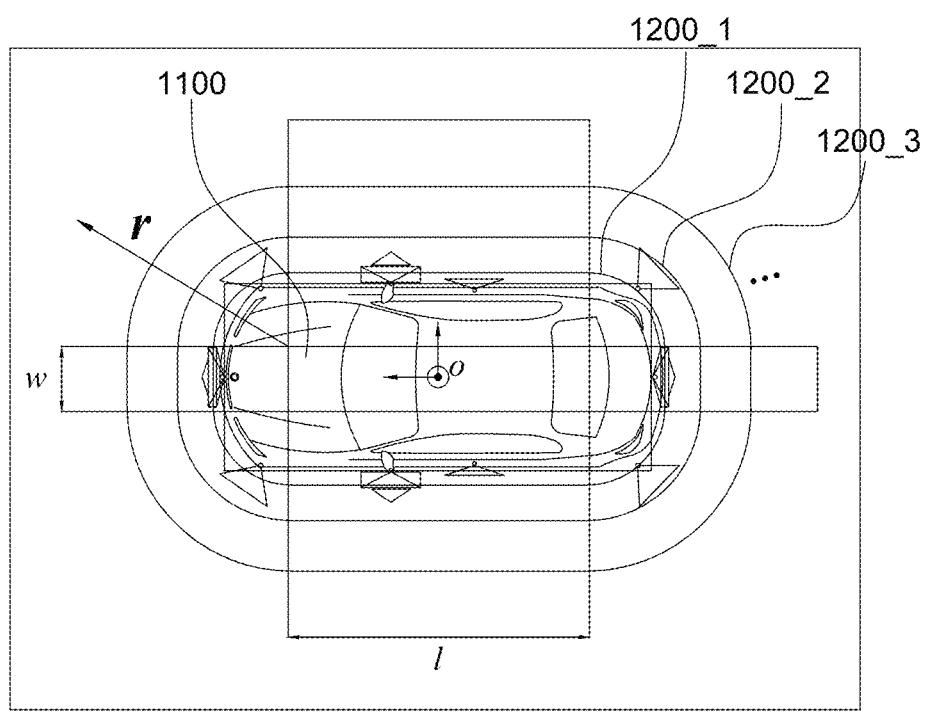
FIG. 11 is a drawing schematically illustrating the reference virtual geometry and the virtual rounded cuboid viewed from above the moving body in accordance with one example embodiment of the present disclosure.

FIG. 11 is a drawing schematically illustrating the reference virtual geometry and the virtual rounded cuboid viewed from above the moving body in accordance with one example embodiment of the present disclosure.

By referring to FIG. 11, it is observed that there may be a plurality of the virtual rounded cuboids 1200_1, 1200_2, 1200_3 that respectively include the curved surfaces and the extended planes and are formed at multiple separation distances from the reference virtual geometry 1100 as mentioned above.

As explained above in relation to FIG. 1, the conventional technology that uses virtual spheres has a problem in that it is hard to estimate the distance information for those objects located within near distances from the moving body. On the other hand, in accordance with the present disclosure, the reference virtual geometry is determined by referring to the aspect ratio of the structure of the moving body or the aspect ratio of the virtual cuboid circumscribed to the moving body, and accurate distance estimation for even those objects located within near distances from the moving body is made possible by using the virtual rounded cuboids that are formed at appropriate separation distances from the reference virtual geometry.

Accordingly, after the plurality of rounded cuboid images are generated by projecting the plurality of images captured by the cameras onto the plurality of virtual rounded cuboids 1200_1, 1200_2, 1200_3, the image processing device may instruct the rounded cuboid sweep network to apply three-dimensional (3D) concatenation operation to the plurality of the rounded cuboid images, thus to generate an initial four-dimensional (4D) cost volume.

For reference, in the spherical coordinate system, a ray $p=(\theta, \varnothing)$ may correspond to $\rho(p)=(\cos(\varnothing)\cos(\theta), \sin(\varnothing), \cos(\varnothing)\sin(\theta))^T$; in a Cartesian coordinate system.

Specifically, each pixel on the rounded cuboid images projected onto the virtual rounded cuboid may be expressed as (θ, Ψ). As an example, these rounded cuboid images may have a resolution of W*H. Also, the azimuth angle θ may vary from −π to π, and the polar angle Ψ may vary from −π/2 to π/2.

Also, as for a separation distance $r_N$ (i.e., radius), a relationship $r_N = 1/r_N^{-1}$ may be established. Herein, $r_N^{-1}$ represents an inverse radius.

Figure 12:
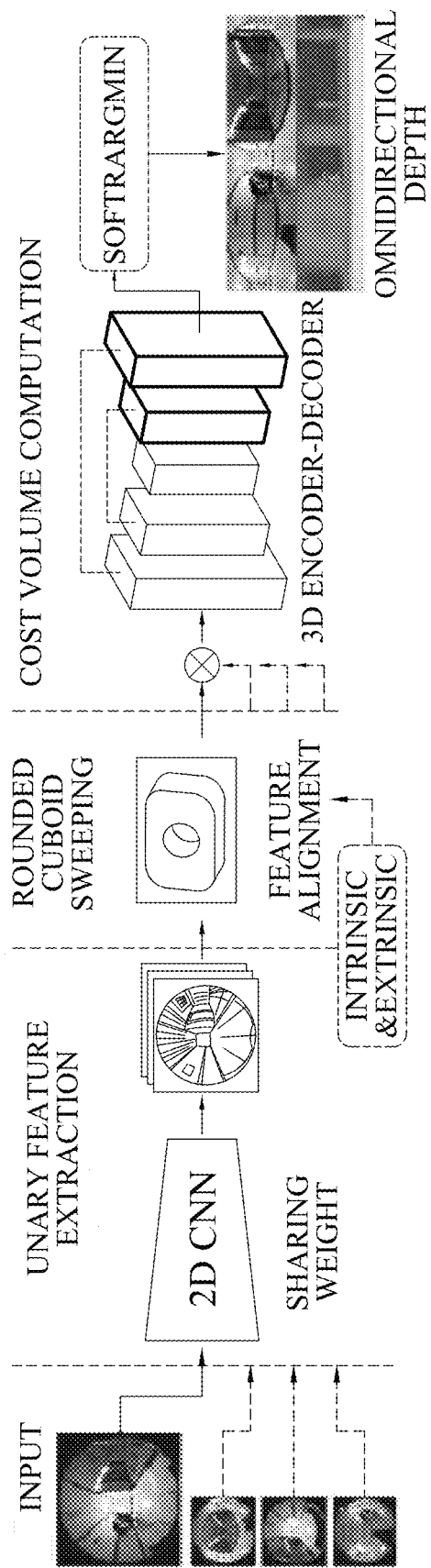
FIG. 12 is a drawing schematically illustrating a distance estimation process in accordance with one example embodiment of the present disclosure.

By referring to FIG. 12, the distance to the object may be estimated by using a unary feature extraction process, a rounded cuboid sweeping process and a cost volume computation process.

As an example, detailed structures of each of models performing the unary feature extraction process, the rounded cuboid sweeping process and the cost volume computation process are shown in Table 1 below.

TABLE 1

| | | | |
|---|---|---|---|
| unary feature extraction | Input | | $H_1 \times W_1$ |
| | conv1 | 5 × 5, 32 | |
| | conv2 | 3 × 3, 32 | |
| | conv3 | 3 × 3, 32, add conv1 | ½$H_1$ × ½$W_1$ × 32 |
| | conv4-11 | repeat conv2-3 | |
| | conv12-17 | repeat conv2-3 with dilate = 2, 3, 4 | |
| rounded cuboid sweeping | warp transference | 3 × 3 × 1, 32 | H × W × ½N × 32<br>½ × ½ × ½ × 32 |
| | concat(4)* | 3 × 3 × 3, 64 | ½ × ½ × ½ × 128 |
| | fusion | | ½ × ½ × ½ × 64 |
| cost volume computation | 3Dconv1-3 | 3 × 3 × 3, 64 | ½ × ½ × ½ × 64 |
| | 3Dconv4-6 | 3 × 3 × 3, 128 | ¼ × ¼ × ¼ × 128 |
| | 3Dconv7-9 | 3 × 3 × 3, 128 | ⅛ × ⅛ × ⅛ × 128 |
| | 3Dconv10-12 | 3 × 3 × 3, 128 | ¹⁄₁₆ × ¹⁄₁₆ × ¹⁄₁₆ × 128 |
| | 3Dconv13-15 | 3 × 3 × 3, 256 | ¹⁄₃₂ × ¹⁄₃₂ × ¹⁄₃₂ × 256 |
| | 3Ddeconv1 | 3 × 3 × 3, 128, add 3Dconv12 | ¹⁄₁₆ × ¹⁄₁₆ × ¹⁄₁₆ × 128 |
| | 3Ddeconv2 | 3 × 3 × 3, 128, add 3Dconv9 | ⅛ × ⅛ × ⅛ × 128 |
| | 3Ddeconv3 | 3 × 3 × 3, 128, add 3Dconv6 | ¼ × ¼ × ¼ × 128 |
| | 3Ddeconv4 | 3 × 3 × 3, 64, add 3Dconv3 | ½ × ½ × ½ × 64 |
| | 3Ddeconv5 | 3 × 3 × 3, 1 | H × W × N |

In addition, the N virtual rounded cuboids may be sampled such that their inverse radii are uniform. For example, when a minimum radius is $r_{min}$, the inverse radius $r_N^{-1}$ of an N-th virtual rounded cuboid is $r_N^{-1} = n/r_{min}(N-1)$, wherein $n \in [0, \ldots, N-1]$.

Further, if the external parameter of the cameras is converted into $\{\Theta_i^*\}$ in the rig coordinate system, the projection function may be expressed as $A_i(\Pi(X; \Phi_i))$.

Based on the description above, a formula to compute pixel values of the rounded cuboid images may be expressed as below.

$$S_{i,n}(p) = I_i\left(\Pi_i\left(M(\Theta_i^*)\begin{bmatrix} \rho(p)^* f(r_N, \theta, \Psi; w, h, 1) \\ 1 \end{bmatrix}\right)\right) \quad \langle\text{Formula 3}\rangle$$

Herein, as explained above, $f(r_N, \theta, \Psi; w, h, 1)$ may represent a specific distance $d_N$ from a predetermined reference point of the reference virtual geometry to a specific point P on an N-th rounded cuboid image projected onto the N-th virtual rounded cuboid. That is, $d_N = f(r_N, \theta, w, h, 1)$.

Herein, $I_i$ is an input image captured from the i-th camera. Meanwhile, when the projected pixels are not in the visible region of the input image, these projected pixels may not be considered in further processing.

FIG. 12 is a drawing schematically illustrating a distance estimation process in accordance with one example embodiment of the present disclosure.

First, through the unary feature extraction process, the plurality of feature maps may be acquired by inputting the plurality of images obtained from the cameras into convolution neural networks (e.g., 2D CNN). As mentioned above, the unary feature extraction process is a process for estimating the distance even with a small amount of computation, and thus may be a process selectively performed according to hardware specifications of the image processing device. Herein, for example, the unary feature map $U = F_{CNN}(I)$ may have a $1/rH_I \times 1/rW_I \times C$ dimensions, wherein $F_{CNN}$ is a 2D CNN for the feature extraction, $H_I$ and $W_I$ are the height and width of the input image, r is the reduction factor, and C is the number of channels.

Then, the plurality of images (or the plurality of feature maps) may be projected onto the virtual rounded cuboids through the rounded cuboid sweeping process. Herein, since the feature maps are projected onto the virtual rounded cuboids in FIG. 12, Formula 3 may be expressed as Formula 4.

$$S_i(\Psi, \theta, n, c) = U_c\left(\frac{1}{r}\Pi_i(p(\theta, \Psi)^* f(r_N, \theta, \Psi; w, h, 1))\right) \quad \langle\text{Formula 4}\rangle$$

Herein, to ensure sufficient disparities between neighboring warped feature maps and to reduce the memory and computation overhead, every other virtual rounded cuboids, i.e., $n \in [0, 2, \ldots, N-1]$, may be used to produce the feature volume $S_i$.

Next, in the cost volume computation process, the feature volumes may be converted to include physical space information for three-dimensional areas in all directions, and a resultant merged outcome may be reflected on a 3D encoder-decoder to generate a depth map.

In detail, the image processing device may apply the three-dimensional (3D) concatenation operation to the plurality of the rounded cuboid images to generate the initial four-dimensional (4D) cost volume, and may input the initial 4D cost volume to a cost volume computation network, including a plurality of 3D convolution layers and their corresponding 3D deconvolution layers, to thereby generate a final 3D cost volume.

Then, the image processing device may (i) generate inverse radius indices by using the final 3D cost volume, wherein each of the inverse radius indices respectively corresponds to each of inverse radii representing each of inverse values of each of the separation distances of the N virtual rounded cuboids, and (ii) extract the inverse radii of the N virtual rounded cuboids by referring to the inverse radius indices, to thereby acquire each of the separation distances and thus acquire the distance from the moving body to the at least one object located in any direction of the moving body.

Herein, the image processing device may generate the inverse radius indices by normalizing the final 3D cost volume according to the azimuth angle and the polar angle of the spherical coordinate system.

The inverse radius indices n̂ may be calculated according to Formula 5 as shown below.

$$\hat{n}(\theta, \Psi) = \sum_{n=0}^{N-1} n \times \frac{e^{-C(\Psi,\theta,n)}}{\sum_{v} e^{-C(\Psi,\theta,v)}} \qquad \langle \text{Formula 5} \rangle$$

Herein, C is a normalized final 3D cost volume.

For example, given that $n \in [0, 1, \ldots, N-1]$, if the value of the inverse radius index generated by using the final 3D cost volume according to Formula 5 above is 3, this corresponds to a fourth virtual rounded cuboid among the N virtual rounded cuboids, and thus a separation distance $r_3$ between the fourth virtual rounded cuboid and the reference virtual geometry is acquired as the separation distance above.

For reference, as mentioned above, each of the extended planes included in the extended plane set of the virtual rounded cuboid is illustrated as being formed at the same separation distance from each of their respective reference planes of the reference virtual geometry, but the present disclosure is not limited thereto.

That is, the extended plane set of the virtual rounded cuboid may include each of the extended planes formed at each of different distances from each of the three reference planes of the reference virtual geometry.

In such case, the image processing device may (i) generate K-th inverse radius indices of K-th inverse radii by using the final 3D cost volume, wherein the K-th inverse radii includes a (K_1)-st inverse radius, a (K_2)-nd inverse radius and a (K_3)-rd inverse radius, respectively representing inverse values of the (K_1)-st separation distance, the (K_2)-nd separation distance and the (K_3)-rd separation distance of the K-th virtual rounded cuboid, and (ii) acquire the (K_1)-st separation distance, the (K_2)-nd separation distance and the (K_3)-rd separation distance by referring to the K-th inverse radii corresponding to the K-th inverse radius indices.

Meanwhile, in order to generate more accurate inverse radius indices, the image processing device may train at least part of the cost volume computation network and the rounded cuboid sweep network.

For example, the image processing device may generate at least one absolute error loss by referring to the inverse radius indices and their corresponding ground truth inverse radius indices and thus training at least part of the rounded cuboid sweep network and the cost volume computation network by using the absolute error loss through an end-to-end way.

Specifically, in order to train at least part of the rounded cuboid sweep network and the cost volume computation network through the end-to-end way, the image processing device may use ground truth inverse radius index as shown below in Formula 6.

$$n^*(\theta, \Psi) = (N-1) \frac{r^*(\theta, \Psi) - r_0}{r_{N-1} - r_0} \qquad \langle \text{Formula 6} \rangle$$

Herein, $r^*(\bullet) = 1/R^*(\bullet)$ is the ground truth inverse radius index, $r_0$ is a minimum inverse radius, and $r_{N-1}$ is a maximum inverse radius.

Also, an absolute error loss between the ground truth inverse radius index and a predicted inverse radius index may be defined as Formula 7 below.

$$L(\theta, \Psi) = \frac{1}{\sum_i M_i(\theta, \Psi)} |\hat{n}(\theta, \Psi) - n^*(\theta, \Psi)| \qquad \langle \text{Formula 7} \rangle$$

As described above, the image processing device in accordance with one example embodiment of the present disclosure is possible to acquire the distance from the moving body to at least one object located in any direction of the moving body by using only a small number of cameras. Also, it is possible to effectively estimate corresponding image pairs among the cameras since the image processing device is able to correct the distortions of the plurality of cameras by using lens distortion parameters and the geometric relationship among the cameras at the same time. In addition, the image processing device is able to compensate for errors in imaging directions of the cameras in real time, thereby preventing performance degradation. Further, as the sampling of various distance candidates becomes flexible, the distance to the object can be easily obtained even if the number of cameras is changed.

The present disclosure has an effect of acquiring the distance of the moving body to at least one object located in any direction of the moving body.

The present disclosure has another effect of flexibly adjusting a distance candidate group for acquiring the distance to at least one object from the moving body.

The present disclosure has still another effect of obtaining an accurate distance to at least one object from the moving body even when a length of a horizontal axis and a length of a vertical axis of the moving body are different from each other.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for acquiring a distance from a moving body to at least one object located in any direction of the moving body, comprising steps of:
    (a) on condition that a plurality of cameras, capable of covering all directions of the moving body by using each of their respective Field of Views (FoVs), have been arranged to be apart from one another on the moving body, an image processing device, in response to acquiring a plurality of images generated by the cameras, inputting the images to a rounded cuboid sweep network and instructing the rounded cuboid sweep network to (i) project a plurality of pixels on the images obtained from the cameras onto N virtual rounded cuboids to thereby generate a plurality of rounded cuboid images, wherein each of the N virtual rounded cuboids includes each of extended plane sets, respectively having three extended planes, and curved surfaces interconnecting at least two of the three extended planes, and wherein each of the three extended planes is formed at each of separation distances from each of three reference planes, orthogonal to one another, of a reference virtual geometry obtained on a basis of a structure of the moving body or an arrangement of the cameras, and (ii) apply three-dimensional (3D) concatenation operation to the plurality of the rounded cuboid images and thus generate an initial four-dimensional (4D) cost volume;
    (b) the image processing device inputting the initial 4D cost volume to a cost volume computation network, including a plurality of 3D convolution layers and their corresponding 3D deconvolution layers, to thereby generate a final 3D cost volume; and
    (c) the image processing device (i) generating inverse radius indices by using the final 3D cost volume, wherein each of the inverse radius indices respectively corresponds to each of inverse radii representing each of inverse values of each of the separation distances of the N virtual rounded cuboids, and (ii) extracting the inverse radii of the N virtual rounded cuboids by referring to the inverse radius indices, to thereby acquire each of the separation distances and thus acquire a distance from the moving body to the at least one object located in any direction of the moving body,
    wherein a K-th virtual rounded cuboid among the N virtual rounded cuboids includes a K-th extended plane set having a (K_1)-st extended plane, a (K_2)-nd extended plane and a (K_3)-rd extended plane, and a K-th curved surface interconnecting at least two of the (K_1)-st extended plane, the (K_2)-nd extended plane and the (K_3)-rd extended plane, wherein the (K_1)-st extended plane, the (K_2)-nd extended plane and the (K_3)-rd extended plane are respectively formed at a (K_1)-st separation distance, a (K_2)-nd separation distance and a (K_3)-rd separation distance respectively from a first reference plane, a second reference plane and a third reference plane which are the three reference planes of the reference virtual geometry, and
    wherein, at the step of (c), the image processing device (i) generates K-th inverse radius indices of K-th inverse radii by using the final 3D cost volume, wherein the K-th inverse radii includes a (K_1)-st inverse radius, a (K_2)-nd inverse radius and a (K_3)-rd inverse radius, respectively representing inverse values of the (K_1)-st separation distance, the (K_2)-nd separation distance and the (K_3)-rd separation distance of the K-th virtual rounded cuboid, and (ii) acquires the (K_1)-st separation distance, the (K_2)-nd separation distance and the (K_3)-rd separation distance by referring to the K-th inverse radii corresponding to the K-th inverse radius indices, wherein K is an integer bigger than or equal to 1 and smaller than or equal to N.

2. The method of claim 1, wherein (i) a (K_1&2)-th curved surface connecting the (K-1)-st extended plane and the (K_2)-nd extended plane, (ii) a (K_2&3)-th curved surface connecting the (K_2)-nd extended plane and the (K_3)-rd extended plane, (iii) a (K_3&1)-th curved surface connecting the (K_3)-rd extended plane and the (K_1)-st extended plane, and (iv) a (K_1&2&3)-th curved surface connecting the (K_1)-st extended plane, the (K_2)-nd extended plane and the (K_3)-rd extended plane are included in the K-th virtual rounded cuboid as the K-th curved surface.

3. A method for acquiring a distance from a moving body to at least one object located in any direction of the moving body, comprising steps of:
    (a) on condition that a plurality of cameras, capable of covering all directions of the moving body by using each of their respective Field of Views (FoVs), have been arranged to be apart from one another on the moving body, an image processing device, in response to acquiring a plurality of images generated by the cameras, inputting the images to a rounded cuboid sweep network and instructing the rounded cuboid sweep network to (i) project a plurality of pixels on the images obtained from the cameras onto N virtual rounded cuboids to thereby generate a plurality of rounded cuboid images, wherein each of the N virtual rounded cuboids includes each of extended plane sets, respectively having three extended planes, and curved surfaces interconnecting at least two of the three extended planes, and wherein each of the three extended planes is formed at each of separation distances from each of three reference planes, orthogonal to one another, of a reference virtual geometry obtained on a basis of a structure of the moving body or an arrangement of the cameras, and (ii) apply three-dimensional (3D) concatenation operation to the plurality of the rounded cuboid images and thus generate an initial four-dimensional (4D) cost volume;

(b) the image processing device inputting the initial 4D cost volume to a cost volume computation network, including a plurality of 3D convolution layers and their corresponding 3D deconvolution layers, to thereby generate a final 3D cost volume; and (c) the image processing device (i) generating inverse radius indices by using the final 3D cost volume, wherein each of the inverse radius indices respectively corresponds to each of inverse radii representing each of inverse values of each of the separation distances of the N virtual rounded cuboids, and (ii) extracting the inverse radii of the N virtual rounded cuboids by referring to the inverse radius indices, to thereby acquire each of the separation distances and thus acquire a distance from the moving body to the at least one object located in any direction of the moving body, wherein, at the step of (a), the image processing device instructs the rounded cuboid sweep network to (i) compute a specific distance $d_M$ equivalent to a distance between a predetermined reference point of the reference virtual geometry and a specific point on an M-th virtual rounded cuboid, wherein M is an integer bigger than or equal to 1 and smaller than or equal to N, and (ii) project the plurality of pixels on the images obtained from the cameras onto the M-th virtual rounded cuboid by referring to the specific distance $d_M$, wherein the specific distance $d_M$ is determined by an equation:

$$d_M = f(r_M, \theta, \Psi; w, h, l)$$

wherein (i) $r_M$ is the separation distance between the reference virtual geometry and the M-th virtual rounded cuboid, (ii) $\theta$ and $\Psi$ are respectively an azimuth angle and a polar angle of a virtual line segment connecting the specific point and the predetermined reference point of the reference virtual geometry in a spherical coordinate system having the predetermined reference point as an origin, and (iii) w, h and l are respectively lengths of a first edge, a second edge and a third edge of the reference virtual geometry which are orthogonal to one another.

4. A method for acquiring a distance from a moving body to at least one object located in any direction of the moving body, comprising steps of:

(a) on condition that a plurality of cameras, capable of covering all directions of the moving body by using each of their respective Field of Views (FoVs), have been arranged to be apart from one another on the moving body, an image processing device, in response to acquiring a plurality of images generated by the cameras, inputting the images to a rounded cuboid sweep network and instructing the rounded cuboid sweep network to (i) project a plurality of pixels on the images obtained from the cameras onto N virtual rounded cuboids to thereby generate a plurality of rounded cuboid images, wherein each of the N virtual rounded cuboids includes each of extended plane sets, respectively having three extended planes, and curved surfaces interconnecting at least two of the three extended planes, and wherein each of the three extended planes is formed at each of separation distances from each of three reference planes, orthogonal to one another, of a reference virtual geometry obtained on a basis of a structure of the moving body or an arrangement of the cameras, and (ii) apply three-dimensional (3D) concatenation operation to the plurality of the rounded cuboid images and thus generate an initial four-dimensional (4D) cost volume;

(b) the image processing device inputting the initial 4D cost volume to a cost volume computation network, including a plurality of 3D convolution layers and their corresponding 3D deconvolution layers, to thereby generate a final 3D cost volume; and (c) the image processing device (i) generating inverse radius indices by using the final 3D cost volume, wherein each of the inverse radius indices respectively corresponds to each of inverse radii representing each of inverse values of each of the separation distances of the N virtual rounded cuboids, and (ii) extracting the inverse radii of the N virtual rounded cuboids by referring to the inverse radius indices, to thereby acquire each of the separation distances and thus acquire a distance from the moving body to the at least one object located in any direction of the moving body, wherein an aspect ratio of the reference virtual geometry is determined by referring to an aspect ratio of the structure of the moving body or an aspect ratio of a virtual cuboid circumscribed to the moving body.

5. The method of claim 1, further comprising a step of:

(d) the image processing device generating at least one absolute error loss by referring to the inverse radius indices and their corresponding ground truth inverse radius indices and thus training at least part of the rounded cuboid sweep network and the cost volume computation network by using the absolute error loss through an end-to-end way.

6. The method of claim 1, wherein each of coordinates of each of pixels located on the rounded cuboid images is represented by using each of azimuth angles and each of polar angles on a virtual spherical coordinate system, and wherein, at the step of (c), the image processing device normalizes the final 3D cost volume by referring to each of the azimuth angles and each of the polar angles of the virtual spherical coordinate system, to thereby generate the inverse radius indices.

7. The method of claim 1, wherein, before the step of (a), the image processing device performs a calibration process which applies an optimization operation to one or more external parameters and one or more internal parameters of the cameras, wherein the optimization operation is carried out by (i-1) locating a checker board, having grid patterns thereon, in between two adjacent cameras among the cameras arranged to be apart from one another on the moving body, and detecting each coordinate of each corner of the checker board by using reference images obtained from the adjacent cameras, (i-2) performing the calibration process capable of optimizing one or more specific external parameters and one or more specific internal parameters of the adjacent cameras by referring to the each coordinate of each corner of the checker board such that a re-projection error between the reference images is minimized, and (ii) while selecting other two adjacent cameras among the cameras, repeatedly performing the calibration process for said other adjacent cameras, to thereby optimize the external parameters and the internal parameters of all the cameras.

8. The method of claim 1, wherein the cameras are arranged to be apart from one another on a rig mounted on the moving body, and
wherein, before the step of (a), the image processing device minimizes (i) a first geometric error associated with camera posture information of the cameras corresponding to rig posture information of the rig, (ii) a second geometric error associated with 3D points corresponding to a surrounding environment map on a location of the moving body, and (iii) a third geometric error associated with external parameters including relative posture information among the cameras, to thereby perform an optimization process that tracks changes in the camera posture information caused by movements of the moving body.

9. The method of claim 8, wherein, in response to receiving the images from the cameras, the image processing device processes the images obtained from the cameras by repeatedly performing an image processing process, to thereby perform the optimization process with processed images, wherein the image processing process includes sub-processes of (i) determining a rig-plane including all the cameras thereon by using a least square calculation, (ii) acquiring information on a specific plane that is perpendicular to the rig-plane and is in parallel to a line connecting two adjacent cameras among the plurality of cameras, (iii) projecting a first image part, captured at a region where the FoVs of the adjacent cameras overlap, onto a planar model parallel to the specific plane and projecting a second image part, captured at a region where the FoVs of the adjacent cameras do not overlap, onto a cylindrical model perpendicular to the specific plane, and (iv) obtaining a hybrid projection model by referring to the planar model and the cylindrical model.

10. The method of claim 9, wherein, after performing the image processing process, the image processing device (i) selects a specific camera from the plurality of cameras and samples multiple sets of image points, wherein each set of image points includes three specific corresponding pairs each of which is comprised of (1) a two-dimensional (2D) image point on a specific image captured by the specific camera and (2) its corresponding actual three-dimensional (3D) point, (ii) repeatedly samples other multiple sets of other image points which include three other corresponding pairs for all other cameras except the specific camera among the cameras, to thereby acquire all pieces of the rig posture information of the rig, and confirms a geometric conformability of the rig posture information by applying all pieces of the rig posture information to all three corresponding pairs, including the three specific corresponding pairs and said three other corresponding pairs, and (iii) determines a certain set of image points which possesses most number of its corresponding pairs with errors smaller than or equal to a preset threshold and selects certain rig posture information corresponding to the certain set of image points as optimized rig posture information for the rig to thereby minimize the first geometric error.

11. The method of claim 1, wherein, at the step of (a), in response to receiving the images from the cameras, the image processing device generates a plurality of feature maps corresponding to the images by inputting the images to a plurality of 2D convolution layers, and thus generates the rounded cuboid images from the feature maps.

12. An image processing device for acquiring a distance from a moving body to at least one object located in any direction of the moving body, comprising:
at least one memory that stores instructions; and
at least one processor configured to execute the instructions to perform or support another device to perform: (I) on condition that a plurality of cameras, capable of covering all directions of the moving body by using each of their respective Field of Views (FoVs), have been arranged to be apart from one another on the moving body, in response to acquiring a plurality of images generated by the cameras, a process of inputting the images to a rounded cuboid sweep network and instructing the rounded cuboid sweep network to (i) project a plurality of pixels on the images obtained from the cameras onto N virtual rounded cuboids to thereby generate a plurality of rounded cuboid images, wherein each of the N virtual rounded cuboids includes each of extended plane sets, respectively having three extended planes, and curved surfaces interconnecting at least two of the three extended planes, and wherein each of the three extended planes is formed at each of separation distances from each of three reference planes, orthogonal to one another, of a reference virtual geometry obtained on a basis of a structure of the moving body or an arrangement of the cameras, and (ii) apply three-dimensional (3D) concatenation operation to the plurality of the rounded cuboid images and thus generate an initial four-dimensional (4D) cost volume, (II) a process of inputting the initial 4D cost volume to a cost volume computation network, including a plurality of 3D convolution layers and their corresponding 3D deconvolution layers, to thereby generate a final 3D cost volume, and (III) processes of (i) generating inverse radius indices by using the final 3D cost volume, wherein each of the inverse radius indices respectively corresponds to each of inverse radii representing each of inverse values of each of the separation distances of the N virtual rounded cuboids, and (ii) extracting the inverse radii of the N virtual rounded cuboids by referring to the inverse radius indices, to thereby acquire each of the separation distances and thus acquire a distance from the moving body to the at least one object located in any direction of the moving body,
wherein a K-th virtual rounded cuboid among the N virtual rounded cuboids includes a K-th extended plane set having a (K_1)-st extended plane, a (K_2)-nd extended plane and a (K_3)-rd extended plane, and a K-th curved surface interconnecting at least two of the (K_1)-st extended plane, the (K_2)-nd extended plane and the (K_3)-rd extended plane, wherein the (K_1)-st extended plane, the (K_2)-nd extended plane and the (K_3)-rd extended plane are respectively formed at a (K_1)-st separation distance, a (K_2)-nd separation distance and a (K_3)-rd separation distance respectively from a first reference plane, a second reference plane and a third reference plane which are the three reference planes of the reference virtual geometry, and
wherein, at the processes of (III), the processor (i) generates K-th inverse radius indices of K-th inverse radii by using the final 3D cost volume, wherein the K-th inverse radii includes a (K_1)-st inverse radius, a (K_2)-nd inverse radius and a (K_3)-rd inverse radius, respectively representing inverse values of the (K_1)-st separation distance, the (K_2)-nd separation distance and the (K_3)-rd separation distance of the K-th virtual rounded cuboid, and (ii) acquires the (K_1)-st separation distance, the (K_2)-nd separation distance and the (K_3)-rd separation distance by referring to the K-th inverse radii corresponding to the K-th inverse radius indices, wherein K is an integer bigger than or equal to 1 and smaller than or equal to N.

13. The device of claim 12, wherein (i) a (K_1&2)-th curved surface connecting the (K-1)-st extended plane and the (K_2)-nd extended plane, (ii) a (K_2&3)-th curved surface connecting the (K_2)-nd extended plane and the (K_3)-rd extended plane, (iii) a (K_3&1)-th curved surface connecting the (K_3)-rd extended plane and the (K_1)-st extended plane, and (iv) a (K_1&2&3)-th curved surface connecting the (K_1)-st extended plane, the (K_2)-nd extended plane and the (K_3)-rd extended plane are included in the K-th virtual rounded cuboid as the K-th curved surface.

14. An image processing device for acquiring a distance from a moving body to at least one object located in any direction of the moving body, comprising:
at least one memory that stores instructions; and
at least one processor configured to execute the instructions to perform or support another device to perform: (I) on condition that a plurality of cameras, capable of covering all directions of the moving body by using each of their respective Field of Views (FoVs), have been arranged to be apart from one another on the moving body, in response to acquiring a plurality of images generated by the cameras, a process of inputting the images to a rounded cuboid sweep network and instructing the rounded cuboid sweep network to (i) project a plurality of pixels on the images obtained from the cameras onto N virtual rounded cuboids to thereby generate a plurality of rounded cuboid images, wherein each of the N virtual rounded cuboids includes each of extended plane sets, respectively having three extended planes, and curved surfaces interconnecting at least two of the three extended planes, and wherein each of the three extended planes is formed at each of separation distances from each of three reference planes, orthogonal to one another, of a reference virtual geometry obtained on a basis of a structure of the moving body or an arrangement of the cameras, and (ii) apply three-dimensional (3D) concatenation operation to the plurality of the rounded cuboid images and thus generate an initial four-dimensional (4D) cost volume, (II) a process of inputting the initial 4D cost volume to a cost volume computation network, including a plurality of 3D convolution layers and their corresponding 3D deconvolution layers, to thereby generate a final 3D cost volume, and (III) processes of (i) generating inverse radius indices by using the final 3D cost volume, wherein each of the inverse radius indices respectively corresponds to each of inverse radii representing each of inverse values of each of the separation distances of the N virtual rounded cuboids, and (ii) extracting the inverse radii of the N virtual rounded cuboids by referring to the inverse radius indices, to thereby acquire each of the separation distances and thus acquire a distance from the moving body to the at least one object located in any direction of the moving body,
wherein, at the process of (I), the processor instructs the rounded cuboid sweep network to (i) compute a specific distance $d_M$ equivalent to a distance between a predetermined reference point of the reference virtual geometry and a specific point on an M-th virtual rounded cuboid, wherein M is an integer bigger than or equal to 1 and smaller than or equal to N, and (ii) project the plurality of pixels on the images obtained from the cameras onto the M-th virtual rounded cuboid by referring to the specific distance $d_M$,
wherein the specific distance $d_M$ is determined by an equation:

$$d_M = f(r_M, \theta, \Psi; w, h, l)$$

wherein (i) $r_M$ is the separation distance between the reference virtual geometry and the M-th virtual rounded cuboid, (ii) θ and Ψ are respectively an azimuth angle and a polar angle of a virtual line segment connecting the specific point and the predetermined reference point of the reference virtual geometry in a spherical coordinate system having the predetermined reference point as an origin, and (iii) w, h and l are respectively lengths of a first edge, a second edge and a third edge of the reference virtual geometry which are orthogonal to one another.

15. An image processing device for acquiring a distance from a moving body to at least one object located in any direction of the moving body, comprising:
at least one memory that stores instructions; and
at least one processor configured to execute the instructions to perform or support another device to perform: (I) on condition that a plurality of cameras, capable of covering all directions of the moving body by using each of their respective Field of Views (FoVs), have been arranged to be apart from one another on the moving body, in response to acquiring a plurality of images generated by the cameras, a process of inputting the images to a rounded cuboid sweep network and instructing the rounded cuboid sweep network to (i) project a plurality of pixels on the images obtained from the cameras onto N virtual rounded cuboids to thereby generate a plurality of rounded cuboid images, wherein each of the N virtual rounded cuboids includes each of extended plane sets, respectively having three extended planes, and curved surfaces interconnecting at least two of the three extended planes, and wherein each of the three extended planes is formed at each of separation distances from each of three reference planes, orthogonal to one another, of a reference virtual geometry obtained on a basis of a structure of the moving body or an arrangement of the cameras, and (ii) apply three-dimensional (3D) concatenation operation to the plurality of the rounded cuboid images and thus generate an initial four-dimensional (4D) cost volume, (II) a process of inputting the initial 4D cost volume to a cost volume computation network, including a plurality of 3D convolution layers and their corresponding 3D deconvolution layers, to thereby generate a final 3D cost volume, and (III) processes of (i) generating inverse radius indices by using the final 3D cost volume, wherein each of the inverse radius indices respectively corresponds to each of inverse radii representing each of inverse values of each of the separation distances of the N virtual rounded cuboids, and (ii) extracting the inverse radii of the N virtual rounded cuboids by referring to the inverse radius indices, to thereby acquire each of the separation distances and thus acquire a distance from the moving body to the at least one object located in any direction of the moving body, wherein an aspect ratio of the reference virtual geometry is determined by referring to an aspect ratio of the structure of the moving body or an aspect ratio of a virtual cuboid circumscribed to the moving body.

16. The device of claim 12, wherein the processor further performs a process of:
(IV) generating at least one absolute error loss by referring to the inverse radius indices and their corresponding ground truth inverse radius indices and thus training at least part of the rounded cuboid sweep network and the cost volume computation network by using the absolute error loss through an end-to-end way.

17. The device of claim 12, wherein each of coordinates of each of pixels located on the rounded cuboid images is represented by using each of azimuth angles and each of polar angles on a virtual spherical coordinate system, and
wherein, at the processes of (III), the processor normalizes the final 3D cost volume by referring to each of the azimuth angles and each of the polar angles of the virtual spherical coordinate system, to thereby generate the inverse radius indices.

18. The device of claim 12, wherein, before the process of (I), the processor performs a calibration process which applies an optimization operation to one or more external parameters and one or more internal parameters of the cameras,
wherein the optimization operation is carried out by (i-1) locating a checker board, having grid patterns thereon, in between two adjacent cameras among the cameras arranged to be apart from one another on the moving body, and detecting each coordinate of each corner of the checker board by using reference images obtained from the adjacent cameras, (i-2) performing the calibration process capable of optimizing one or more specific external parameters and one or more specific internal parameters of the adjacent cameras by referring to the each coordinate of each corner of the checker board such that a re-projection error between the reference images is minimized, and (ii) while selecting other two adjacent cameras among the cameras, repeatedly performing the calibration process for said other adjacent cameras, to thereby optimize the external parameters and the internal parameters of all the cameras.

19. The device of claim 12, wherein the cameras are arranged to be apart from one another on a rig mounted on the moving body, and
wherein, before the process of (I), the processor minimizes (i) a first geometric error associated with camera posture information of the cameras corresponding to rig posture information of the rig, (ii) a second geometric error associated with 3D points corresponding to a surrounding environment map on a location of the moving body, and (iii) a third geometric error associated with external parameters including relative posture information among the cameras, to thereby perform an optimization process that tracks changes in the camera posture information caused by movements of the moving body.

20. The device of claim 19, wherein, in response to receiving the images from the cameras, the processor processes the images obtained from the cameras by repeatedly performing an image processing process, to thereby perform the optimization process with processed images, wherein the image processing process includes sub-processes of (i) determining a rig-plane including all the cameras thereon by using a least square calculation, (ii) acquiring information on a specific plane that is perpendicular to the rig-plane and is in parallel to a line connecting two adjacent cameras among the plurality of cameras, (iii) projecting a first image part, captured at a region where the FoVs of the adjacent cameras overlap, onto a planar model parallel to the specific plane and projecting a second image part, captured at a region where the FoVs of the adjacent cameras do not overlap, onto a cylindrical model perpendicular to the specific plane, and (iv) obtaining a hybrid projection model by referring to the planar model and the cylindrical model.

21. The device of claim 20, wherein, after performing the image processing process, the processor (i) selects a specific camera from the plurality of cameras and samples multiple sets of image points, wherein each set of image points includes three specific corresponding pairs each of which is comprised of (1) a two-dimensional (2D) image point on a specific image captured by the specific camera and (2) its corresponding actual three-dimensional (3D) point, (ii) repeatedly samples other multiple sets of other image points which include three other corresponding pairs for all other cameras except the specific camera among the cameras, to thereby acquire all pieces of the rig posture information of the rig, and confirms a geometric conformability of the rig posture information by applying all pieces of the rig posture information to all three corresponding pairs, including the three specific corresponding pairs and said three other corresponding pairs, and (iii) determines a certain set of image points which possesses most number of its corresponding pairs with errors smaller than or equal to a preset threshold and selects certain rig posture information corresponding to the certain set of image points as optimized rig posture information for the rig to thereby minimize the first geometric error.

22. The device of claim 12, wherein, at the process of (I), in response to receiving the images from the cameras, the processor generates a plurality of feature maps corresponding to the images by inputting the images to a plurality of 2D convolution layers, and thus generates the rounded cuboid images from the feature maps.

* * * * *